US012115793B2

(12) United States Patent
Keupp et al.

(10) Patent No.: US 12,115,793 B2
(45) Date of Patent: Oct. 15, 2024

(54) METHOD FOR CHANGING AT LEAST ONE PRINTING FLUID, AND METHOD FOR CLEANING AND/OR MAINTAINING AT LEAST ONE PRINTING FLUID SUPPLY SYSTEM, AND PRINTING PRESS

(71) Applicant: KOENIG & BAUER AG, Würzburg (DE)

(72) Inventors: Joachim Keupp, Rimpar (DE); Marius Malina, Eußenheim (DE); Christian Michel, Geroldshausen (DE); Andreas Rumpel, Eussenheim (DE); Patrick Walter, Kirchzell (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/289,395

(22) PCT Filed: May 12, 2022

(86) PCT No.: PCT/EP2022/062879
§ 371 (c)(1),
(2) Date: Nov. 3, 2023

(87) PCT Pub. No.: WO2023/006271
PCT Pub. Date: Feb. 2, 2023

(65) Prior Publication Data

US 2024/0269983 A1 Aug. 15, 2024

(30) Foreign Application Priority Data

Jul. 30, 2021 (DE) ..................... 10 2021 119 858.5

(51) Int. Cl.
*B41J 2/17* (2006.01)
*B41J 2/185* (2006.01)

(52) U.S. Cl.
CPC ........... *B41J 2/1707* (2013.01); *B41J 2/1728* (2024.05); *B41J 2/185* (2013.01)

(58) Field of Classification Search
CPC ......... B41J 2/1707; B41J 2/1728; B41J 2/185
See application file for complete search history.

(56) References Cited

U.S. PATENT DOCUMENTS 8,171,876 B2 5/2012 Namekawa et al.
2014/0104360 A1 * 4/2014 Hacker ...................... B41J 3/60 347/104
2020/0101755 A1 4/2020 Tsujino

FOREIGN PATENT DOCUMENTS

AT 412332 B * 12/2004 .............. B41J 2/175
AT 507445 B1 * 9/2011 .............. B41J 2/175
(Continued)

OTHER PUBLICATIONS

International Search Report of PCT/EP2022/062879 dated Aug. 24, 2022.

*Primary Examiner* — Sharon Polk
(74) *Attorney, Agent, or Firm* — MATTINGLY & MALUR, PC

(57) ABSTRACT

At least one printing fluid of a printing fluid supply system of a printing press is changed. A printing unit of the printing press includes a print head. At least a first printing fluid or second printing fluid is selectively conducted from at least one supply unit to the print head. The at least one supply unit includes a reservoir of the first printing fluid and a reservoir of the second printing fluid. The at least one supply unit further includes an intermediate tank of the first printing fluid and an intermediate tank of the second printing fluid arranged between the reservoirs and the print head in the flow direction of printing fluid. The first and second printing fluids are conducted from their respective intermediate tanks (Continued)

to the print head, and there is no return of the printing fluids from the intermediate tanks to the respective reservoirs.

20 Claims, 4 Drawing Sheets

(56) References Cited

FOREIGN PATENT DOCUMENTS

| | | | | | |
|---|---|---|---|---|---|
| DE | 102019130578 | A1 | | 5/2021 | |
| JP | 10296958 | A | * | 11/1998 | ............. B41F 31/08 |
| JP | 2007-275822 | A | | 10/2007 | |
| JP | 2015-047819 | A | | 3/2015 | |
| WO | 2021/130484 | A1 | | 7/2021 | |

* cited by examiner

METHOD FOR CHANGING AT LEAST ONE PRINTING FLUID, AND METHOD FOR CLEANING AND/OR MAINTAINING AT LEAST ONE PRINTING FLUID SUPPLY SYSTEM, AND PRINTING PRESS

CROSS-REFERENCES TO RELATED APPLICATIONS

This application is the US national phase, under 35 USC § 371, of PCT/EP2022/062879, filed on May 12, 2022, published as WO 2023/006271 A1 on Feb. 2, 2023, and claiming priority to DE 10 2021 119 858.5, filed Jul. 30, 2021, and all of which are expressly incorporated by reference herein in their entireties.

TECHNICAL FIELD

Examples herein relate to a method for changing at least one printing fluid, to a method for cleaning and/or maintaining at least one printing fluid supply system, and to a printing press. For instance, a method of changing at least one printing fluid may include changing at least one printing fluid of at least one printing fluid supply system of a printing press, in which at least one printing unit of the printing press includes at least one print head, and selectively changing at least one first printing fluid or at least one second printing fluid that is conducted from at least one supply unit of the at least one printing fluid supply system to the at least one print head. The at least one supply unit includes at least one reservoir of the first printing fluid and at least one reservoir of the second printing fluid. The at least one supply unit further includes at least one intermediate tank of the first printing fluid and at least one intermediate tank of the second printing fluid. The intermediate tanks are arranged between the at least one reservoir of printing fluid and the at least one print head in the flow direction of printing fluid. The at least one first printing fluid or the at least one second printing fluid is conducted from its at least one intermediate tank to the at least one print head, and the at least one first printing fluid is conducted back into its at least one intermediate tank prior to the introduction of the at least one second printing fluid.

In addition, in a method for cleaning and/or maintaining at least one printing fluid supply system of a printing press, in at least one first feeding step, at least one print head of at least one printing unit is supplied with at least one first printing fluid. At least one supply unit of the printing fluid supply system includes at least one intermediate tank of the first printing fluid. After the at least one first feeding step, the feeding of the at least one first printing fluid being stopped and/or at least one cleaning agent being introduced into the at least one printing fluid supply system, the at least one first printing fluid is conducted back into its at least one intermediate tank prior to the introduction of at least one cleaning agent and/or prior to the introduction of at least one second printing fluid. After the at least one first feeding step, the at least one printing fluid supply system is rinsed with the at least one cleaning agent in at least one cleaning step. After the at least one cleaning step, the feeding of cleaning agent is stopped and the at least one second printing fluid is introduced into the at least one printing fluid supply system.

Furthermore, in some examples, a printing press includes at least one printing fluid supply system, the at least one printing fluid supply system including at least one supply unit for supplying at least one print head with printing fluid. The at least one supply unit includes at least one reservoir of at least one first printing fluid and at least one reservoir of at least one second printing fluid. The at least one reservoir of the at least one first printing fluid and the at least one reservoir of the at least one second printing fluid are connected, in terms of conduction, to the at least one print head. The at least one supply unit includes at least one intermediate tank of the at least one first printing fluid and at least one intermediate tank of the at least one second printing fluid.

BACKGROUND

Various printing methods are employed in printing presses, for example rotary printing, offset printing, planographic printing, letterpress printing, screen printing or rotogravure printing, or also non-impact printing methods. Non-impact printing (NIP) methods shall be understood to mean printing methods that do not require a fixed, i.e., physically invariable, printing forme. Such printing methods can generate different print images in each printing operation. Examples of non-impact printing methods include ionographic methods, magnetographic methods, thermographic methods and, in particular, ink jet printing methods. Such printing methods usually have at least one image-producing device, for example at least one print head. In the case of the ink jet printing method, such a print head is configured, for example, as an ink jet print head and comprises at least one nozzle, and preferably multiple nozzles by means of which at least one printing fluid, for example in the form of ink droplets, can deliberately be transferred onto a print substrate.

In a printing fluid supply system, the printing fluid, in particular the ink, is delivered to a print head, preferably by means of negative pressure, for example generated by a pump. Printing fluid and/or ink that is not needed is recirculated in a return to a return reservoir and/or return container. System disruptions are undesirable in such a circular system. The print heads in particular require consistent rheological properties, for example for stable "jetting," i.e., a stable ejection of printing fluid by means of a nozzle. Air and/or foam in the printing fluid feed must also be avoided. Air in the system can arise, for example, due to faulty print settings, leaks, or excessive local flows. Operator errors can also lead to air and/or foam in the system.

A device for supplying multiple print heads with ink in a circulating manner is known from DE 10 2019 130 578 A1. A storage tank supplies ink to the print heads. Changes of an ink level in an equalizing tank are corrected by the connection of the equalizing tank, which is arranged between the storage tank and the print heads, to a compressed air source, and due to the fact that a membrane-less interface is present between the ink volume and an air volume in the equalizing tank.

The printing fluid supply system is only designed for one printing fluid, in particular ink, which is conducted and/or can be conducted, for example, to all print heads connected to the printing fluid supply system. When a change to another printing fluid occurs, for example an ink having a different color, it is necessary to empty the system in a complex process, and fill it with the new printing fluid in a complex process.

The teaching of JP 2015047819 A discloses an ink jet printing press comprising at least one print head and an ink storage tank for feeding ink to the at least one printing head. The printing press comprises a switching device for switching between feeding an ink of a first fixing type, feeding an ink of a second fixing type, and feeding cleaning liquid to the ink storage tank. When changing inks, the cleaning liquid is conducted into the ink storage tank and to the print head, after the ink of the first fixing type has been emptied from the ink storage tank into a disposal container. Thereafter, the ink of the second fixing type is conducted into the ink storage tank and to the print head. Since the replaced ink is disposed of into the disposal container, the consumption of ink is very high.

WO 2021/130484 A1 shows a printing unit comprising an ink jet print head printing according to the continuous ink jet method and a cleaning method for the print head. The printing unit comprises a reservoir of ink and a reservoir of solvent, wherein the ink and the solvent are conducted via a service module and an ink storage system of the ink feed system to a print head. Unused ink is conducted from the print head back to the ink storage system. Solvent used for cleaning can be fed back to the ink feed system.

JP 2007 275822 A discloses a device for ejecting a coating liquid. The device comprises a print head and a liquid supply system connected to the print head. This system comprises two containers for feeding coating liquids. The containers in each case comprise a main tank for storing the coating liquid and a buffer container for collecting the coating liquid. In addition, a tank for cleaning liquid is provided. The printing fluid is conducted from the main tank to the print head, and printing fluid that has not been consumed is conducted back into the buffer container. The printing fluid is conducted from the buffer container back into its main tank. For changing the printing fluid, a second main tank and a buffer container are integrated into the circulation system by valves.

SUMMARY

It is an object of some examples herein to provide a method for changing at least one printing fluid, and a method for cleaning and/or maintaining at least one printing fluid supply system, and a printing press.

The object is achieved according to some examples by a method for changing a printing fluid in a printing press that includes at least one intermediate tank provides no return of the printing fluid from the at least one intermediate tank to the respective at least one reservoir of the printing fluid. In addition, in some examples, a method for cleaning and/or maintaining at least one printing fluid supply system (09) of a printing press includes that the at least one printing fluid supply system is rinsed with the at least one second printing fluid in at least one post-rinsing step, and that the at least one second printing fluid is conducted to at least one disposal station after the at least one post-rinsing step. Furthermore, in some examples, a printing press that includes at least one intermediate tank of at least one first printing fluid and at least one intermediate tank of the at least one second printing fluid provides no return of the printing fluid from the intermediate tanks to the respective reservoirs.

The printing press advantageously comprises at least one printing unit comprising at least one print head, in particular at least one print head configured as an ink jet print head. The printing press advantageously comprises at least one printing fluid supply system, preferably for supplying the at least one print head with printing fluid. The at least one printing fluid supply system advantageously comprises at least one supply unit, preferably for supplying the at least one print head with printing fluid. The at least one supply unit preferably comprises at least one reservoir of at least one first printing fluid. The at least one supply unit preferably comprises at least one reservoir of at least one second printing fluid. The at least one supply unit advantageously comprises at least one valve, preferably at least one valve configured as a check valve and/or gate. The at least one reservoir of the at least one first printing fluid and the at least one reservoir of the at least one second printing fluid are advantageously connected, in terms of conduction, to the at least one print head. The at least one reservoir of the at least one first printing fluid and the at least one reservoir of the at least one second printing fluid are preferably connected, in terms of conduction, to the at least one print head by means of at least one valve configured as a feed valve. Advantageously, this allows printing fluid of the at least one printing fluid supply system to be changed easily and quickly, for example during a job change.

The at least one supply unit advantageously comprises at least one reservoir of at least one cleaning agent. Advantageously, the at least one reservoir of the at least one first printing fluid and the at least one reservoir of the at least one second printing fluid, and advantageously additionally the at least one reservoir of the at least one cleaning agent, are preferably connected, in terms of conduction, to the at least one print head by means of the at least one valve configured as a feed valve. Advantageously, this ensures optimal cleaning and/or maintenance of the at least one printing fluid supply system, in particular when the printing fluid is being changed.

Preferably, at least one nozzle bar of the at least one printing unit comprises the at least one print head. The at least one supply unit is preferably arranged outside the at least one nozzle bar and/or outside the at least one printing unit. This advantageously ensures the accessibility of the components of the at least one supply unit and/or of the at least one printing unit by an operator.

The at least one supply unit preferably comprises at least one intermediate tank of the at least one first printing fluid and/or at least one intermediate tank of the at least one second printing fluid. The at least one intermediate tank is preferably arranged between the at least one reservoir of printing fluid and the at least one print head, in each case in the flow direction of printing fluid. The at least one intermediate tank is preferably arranged in each case between the at least one reservoir and the at least one valve, preferably the at least one feed valve and/or the at least one return valve, in the flow direction of printing fluid. Advantageously, the first printing fluid and the second printing fluid can remain in the particular intermediate tank even during a printing fluid change. Advantageously, the at least one intermediate tank in each case prevents the printing fluid available in the particular reservoir, preferably the first printing fluid or the second printing fluid, from becoming contaminated.

Advantageously, a method for changing at least one printing fluid of at least one printing fluid supply system of a printing press and/or a method for cleaning and/or maintaining at least one printing fluid supply system of a printing press are created. Advantageously, selectively the at least one first printing fluid or the at least one second printing fluid is conducted from the at least one supply unit of the at least one printing fluid supply system to the at least one print head. The at least one first printing fluid or the at least one second printing fluid is preferably in each case conducted from its at least one intermediate tank to the at least one print head.

Advantageously, selectively the at least one first printing fluid or the at least one second printing fluid or the at least one cleaning agent is conducted from the at least one supply unit to the at least one print head. Advantageously, simple switching between the fed fluids, in particular a simple and rapid change of the printing fluid, is preferably carried out by means of the at least one valve configured as a feed valve.

In at least one first feeding step, the at least one print head of the at least one printing unit is preferably supplied with the at least one first printing fluid. Prior to at least one cleaning agent being introduced and/or at least one second printing fluid being introduced, the at least one first printing fluid is preferably conducted back into its at least one intermediate tank. After the at least one first feeding step, the feeding of the at least one first printing fluid is preferably stopped and/or at least one cleaning agent is introduced into the at least one printing fluid supply system. After the at least one first feeding step, the at least one printing fluid supply system is preferably rinsed with the at least one cleaning agent in at least one cleaning step. Preferably, residue of the at least one first printing fluid and/or dirt are dissolved and/or rinsed out in at least one cleaning step designed as a pre-rinsing step. Preferably, residue of the at least one first printing fluid and/or dirt are preferably completely dissolved and/or rinsed out in at least one cleaning step designed as a main rinsing step. Preferably, the at least one first printing fluid is in particular removed from the at least one print head in the at least one main rinsing step, and preferably is replaced with the at least one cleaning agent. In this way, the at least one print head is advantageously continuously filled with fluid, in particular printing fluid and/or cleaning agent. After the at least one cleaning step, the feeding of cleaning agent is preferably stopped and/or the at least one second printing fluid is introduced into the at least one printing fluid supply system. Preferably, the at least one print head is rinsed with the at least one second printing fluid in at least one post-rinsing step, and the at least one second printing fluid is then preferably disposed of. Subsequent to the at least one post-rinsing step, the at least one second printing fluid is preferably introduced again, which is then preferably available for a new print job.

The advantages achieved with the invention are in particular that the change from a first printing fluid to at least one second printing fluid is carried out in an automated manner. The printing press preferably has at least one first operating state in which the at least one print head is preferably supplied with the at least one first printing fluid. The printing press preferably has at least one second operating state in which the at least one print head is preferably supplied with the at least one second printing fluid. The printing press preferably has at least one third operating state in which the at least one print head is preferably supplied with the at least one cleaning agent.

Advantageously, the at least one valve, in particular the at least one feed valve and/or the at least one return valve, is controlled by means of at least one control unit of the printing press.

The at least one first printing fluid is advantageously replaced quickly and easily with the at least one second printing fluid. Advantageously, the at least one printing fluid supply system is maintained easily and quickly. The multi-stage rinsing process preferably prevents a formation of foam within the at least one printing fluid supply system. Advantageously, a formation of foam within the at least one printing fluid supply system is prevented, which is to be avoided since this in particular adversely affects the printing behavior of the printing fluid used. Advantageously, no additional oxygen is incorporated into the printing fluid, which, for example, adversely affects the printing behavior of the printing fluid. Advantageously, the use of the at least one cleaning step and/or of the at least one post-rinsing step constitutes an optimal rinsing and/or cleaning process of the at least one printing fluid supply system, whereby residue is preferably completely removed.

Advantageously, the printing fluids last longer. In particular, a contamination of a printing fluid with cleaning agent and/or another printing fluid is prevented.

Advantageously, the at least one printing fluid supply system results in relief for the operator since no additional cleaning steps or further cleaning methods are required. Advantageously, the amount of required printing fluid is reduced, preferably by reducing the amount of printing fluid to be disposed of. This advantageously saves resources. A replaced printing fluid and/or the printing fluid stored in the intermediate tank can preferably be reused. Advantageously, the printing fluid in the reservoirs is protected against contamination.

BRIEF DESCRIPTION OF THE DRAWINGS

Further advantages are apparent from the following description of the drawings. Exemplary embodiments of the invention are illustrated in the drawings and will be described in greater detail below. The drawings show.

DETAILED DESCRIPTION

Figure 1:
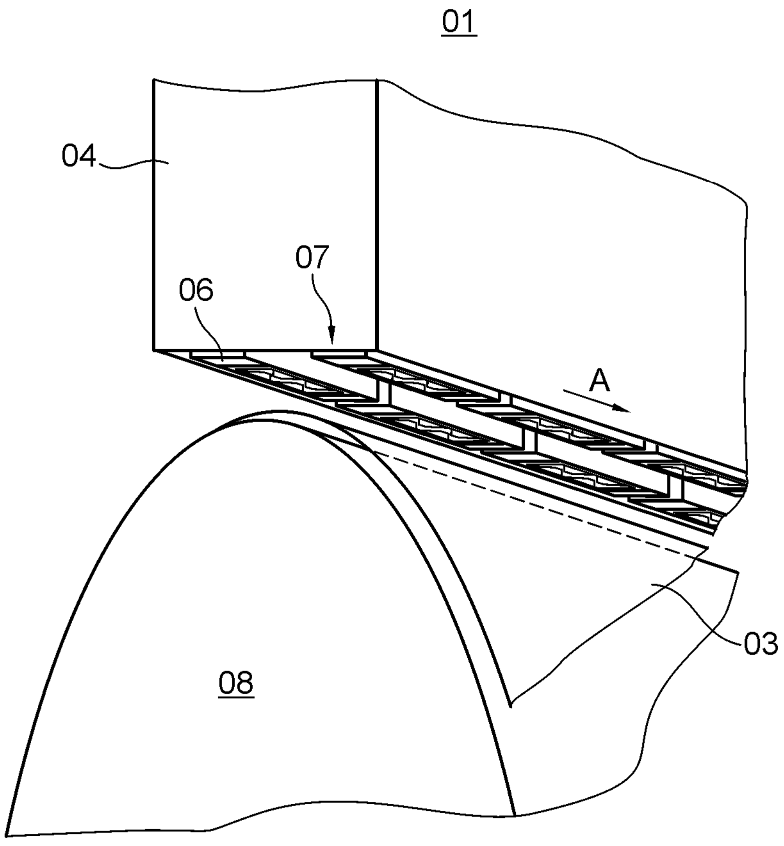
FIG. 1 a schematic representation of a nozzle bar of a printing unit.
Figure 2:
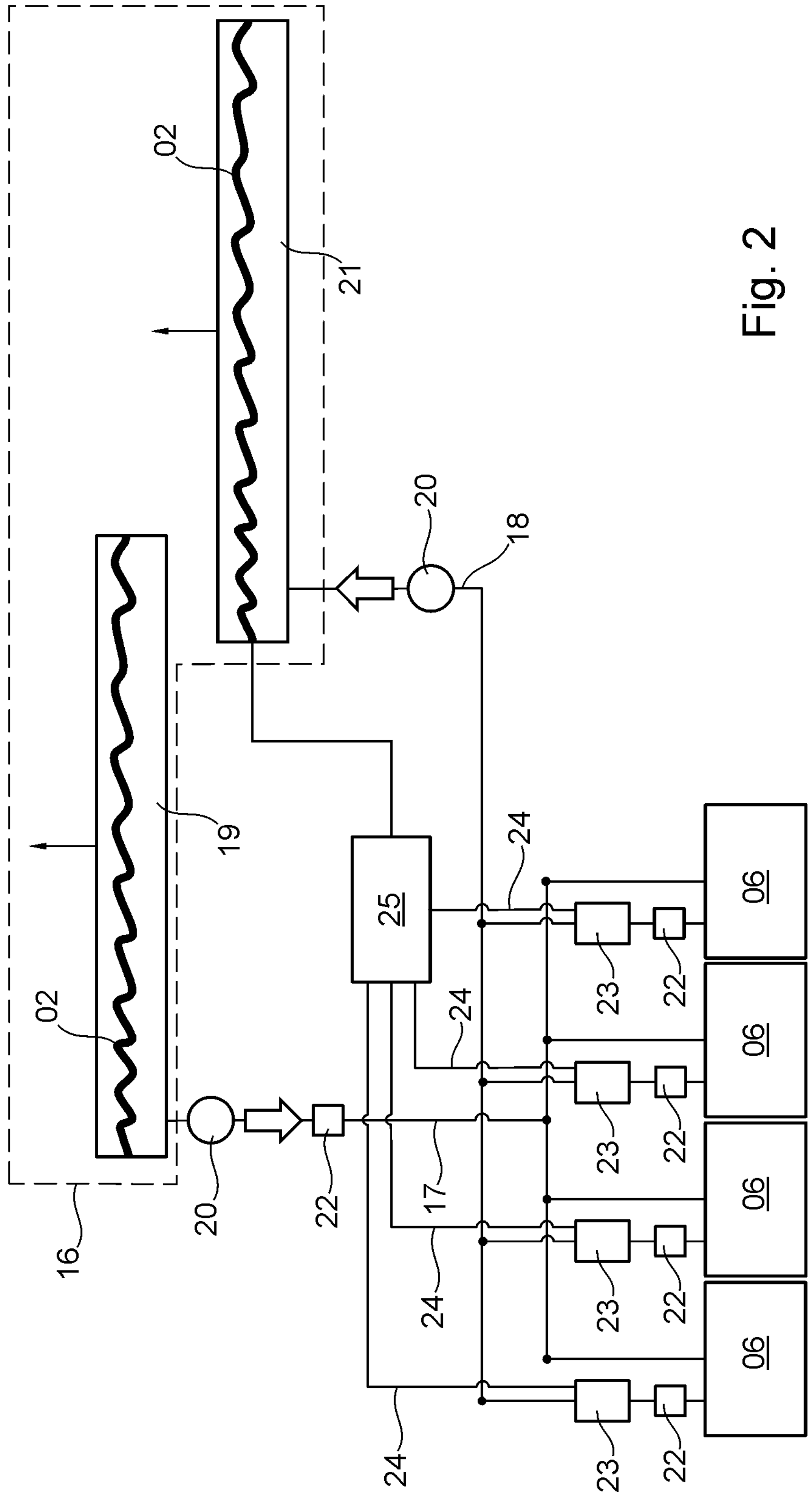
FIG. 2 a schematic representation of a part of a printing fluid supply system comprising a receiver tank and multiple print heads in one embodiment.
Figure 3:
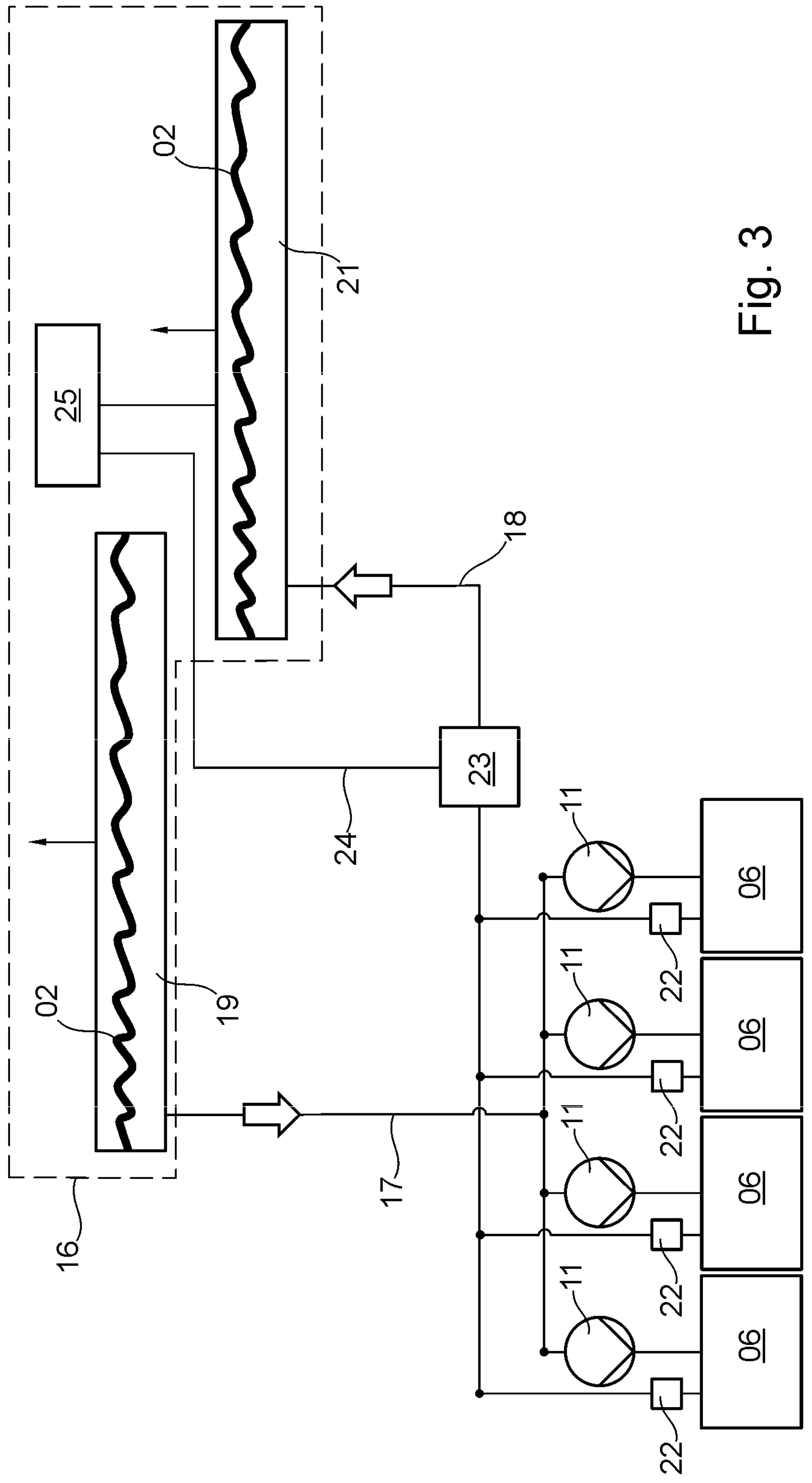
FIG. 3 a schematic representation of a part of a printing fluid supply system comprising a receiver tank and multiple print heads in another embodiment.
Figure 4:
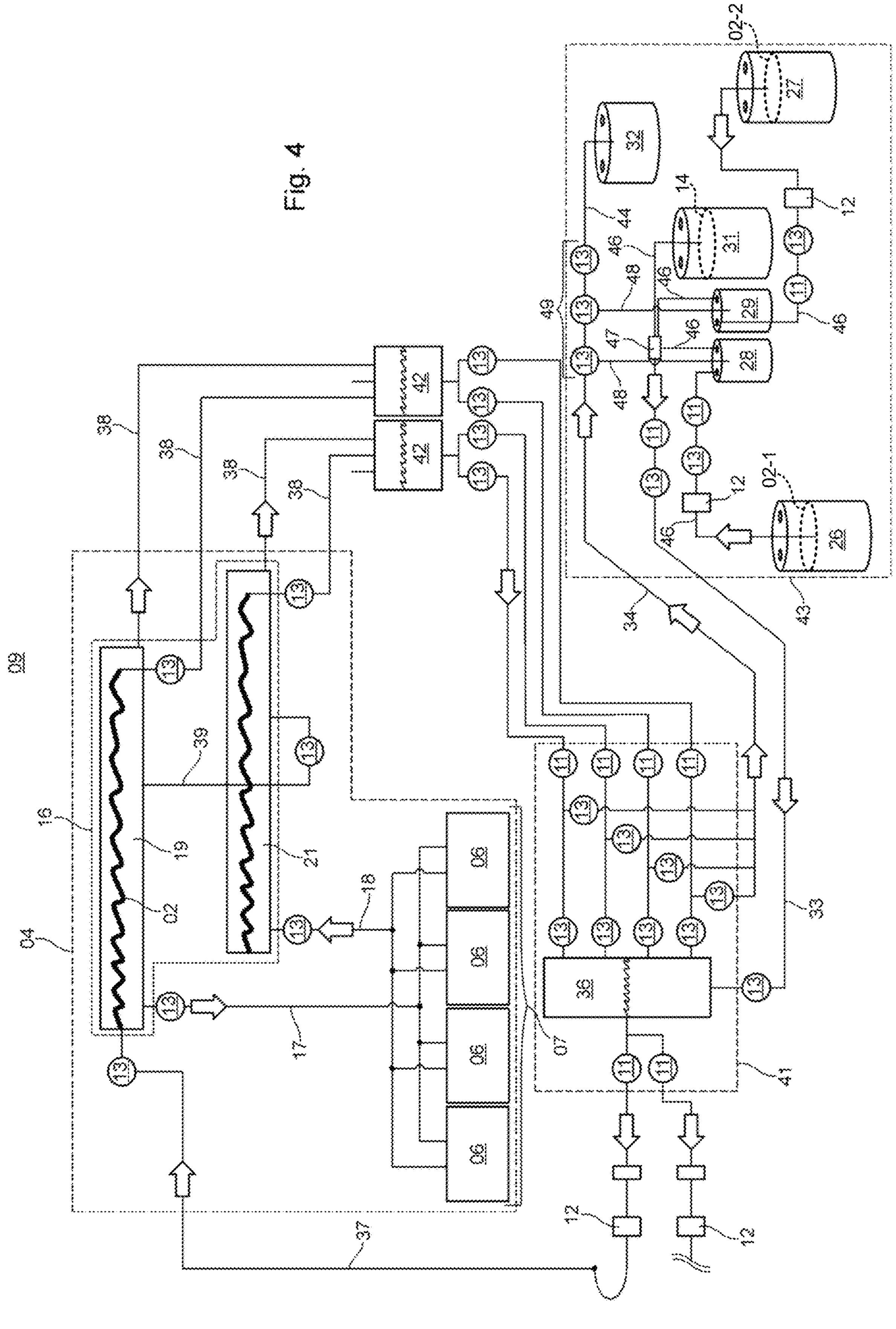
FIG. 4 a schematic illustration of a printing fluid supply system comprising a supply unit.

A print substrate-processing and/or print substrate-working machine, in particular a printing press, for example a sheet-fed printing press or a web-fed printing press, comprises at least one or more, for example at least two, preferably at least four printing units 01, by way of which at least one, for example sheet-format or web-format, print substrate 03, for example a sheet or a print substrate web, can be printed and/or is printed with at least one printing fluid 02 on one side or on both sides, preferably in an ink jet process. The at least one printing unit 01 is preferably configured as an ink jet printing unit 01 and/or as a plateless printing unit 01 and/or as an ink jet printing unit 01. In addition to the at least one printing unit 01, the printing press preferably comprises at least one print substrate source and/or at least one predryer assigned in each case to the at least one printing unit 01 and/or at least one main dryer and/or at least one post-dryer assigned in each case to the at least one printing unit 01 and/or, for example, at least one post-processing device, preferably at least one finish coating mechanism, and/or at least one print substrate delivery. The finish coating mechanism preferably applies a finish coating, for example water-based varnish or print varnish or UV varnish or functional varnish, onto the print substrate 03 printed by way of the at least one printing unit 01. So as to print the print substrate 03 on both sides, the printing press preferably comprises at least one turning device, for example in the form of at least one reversing drum and/or at least one guide element.

The printing press is preferably configured as a production line for processing print substrates 03, preferably for producing folder-type boxes and/or for producing packaging and/or for producing decorative products, such as laminates, more preferably for producing intermediate products, having folder-type boxes and/or packaging and/or decorative products as their end products. The print substrate 03 is preferably embodied as a decorative paper or decorative foil or paper or cardboard or corrugated cardboard or paperboard or textile or foil, for example a plastic foil or metal foil, or a metal sheet. The print substrate 03 preferably has a web format, and, for example, alternatively the print substrate 03 has a sheet format.

A printing unit 01 shall preferably be understood to mean a device by means of which at least one printing fluid 02 is or can be applied to at least one of the sides of a web-format or sheet-format print substrate 03. The at least one printing unit 01 of the printing press preferably has at least one printing nip. The at least one printing unit is preferably configured to apply at least one printing fluid 02, in particular at least one ink or printing ink, onto the at least one print substrate 03. Preferably, a print substrate 03 including at least one printing fluid 02, in particular printing ink or ink, that has been applied by way of the at least one printing unit 01, includes at least one, preferably finely structured, print image that contains image information. The at least one printing unit 01 preferably has a modular design and/or comprises at least one housing, preferably enclosing the printing unit.

Preferably, the printing press, in particular the at least one printing unit 01, comprises at least one nozzle bar 04, preferably comprising at least one print head 06, preferably at least two print heads 06, more preferably at least eight print heads 06, more preferably at least ten print heads 06, more preferably at least twenty print heads 06, more preferably in each case multiple print heads 06. The at least one print head 06 is preferably configured as an ink jet print head 06.

Preferably, the at least one nozzle bar 04 is a unit of the printing unit 01, which preferably comprises the at least one print head 06. The nozzle bar 04 preferably comprises at least one guide, preferably for varying the distance between the at least one print head 06 and the transport path of print substrate 03. In particular, the distance in one direction, preferably having at least one vertical component, is varied, the direction more preferably being oriented perpendicularly to the transport path of print substrate 03 beneath the at least one print head 06. For example, the at least one nozzle bar 04 comprises at least one housing having a longest side and a shortest side, wherein the longest side is preferably arranged transversely to the transport direction of print substrate 03.

In the case where the at least one nozzle bar 04 in each case comprises only one print head 06, this print head 06 preferably extends across an entire working width of the printing press. In the case where the at least one nozzle bar 04 in each case comprises at least two, for example at least eight, preferably at least ten, more preferably at least twenty print heads 06, these print heads 06 are preferably configured as at least one print head row 07 or more preferably as at least one double row, i.e., preferably two mutually parallel rows, of print heads 06. The at least one print head row 07 or double row preferably extends across an entire working width of the printing press. In the case of a double row of print heads 06, the at least one row of nozzles of the respective nozzle bar 04 is preferably divided among at least two interrupted print head rows 07. The at least one print head 06 comprises at least one exit surface. The exit surface of a print head 06 is a surface of the print head 06 that faces the transport path and includes at least one nozzle for ejecting printing fluid, in particularly in the form of droplets. The exit surface is, for example, configured as a parallelogram, preferably as a non-rectangular parallelogram. An ellipse, in particular a circle, is another exemplary embodiment of the exit surface. The at least one print head 06 includes, and preferably all print heads 06 of the print head row 07 or of the double row include one of the colors cyan, magenta, yellow, black, red, green, blue or special colors as the printing fluid 02. In a multicolor printing process, preferably at least two print head rows 07 or double rows, more preferably at least two printing units 01, including printing fluids that differ from one another, in particular having different colors, are arranged one behind the other along the transport path of print substrate 03. The print substrate 03 is preferably moved relative to the at least one print head 06. Preferably, the at least one print head 06 is stationary, i.e., for example, is fixedly arranged during the printing operation, while the print substrate 03 is being moved in the transport direction.

For producing printing fluid droplets, the at least one print head 06 preferably operates according to the drop-on-demand process, wherein printing fluid droplets are deliberately produced when needed. The at least one print head 06 preferably comprises one piezo element per nozzle. The piezo element, for example, varies a volume of the print head 06 filled with printing fluid when an electrical voltage is applied and/or when an applied electrical voltage is changed at a rapid pace, in particular decreased. In this way, the printing fluid is at least partially displaced from the volume and is at least partially ejected through a nozzle connected to the volume. The at least partially ejected printing fluid preferably has a volume of at least 40 pL (picoliters), in particular at least 45 pL. The ejected printing fluid preferably forms at least one printing fluid droplet. For example, when the printing press is being operated, the at least one printing fluid droplet is transferred onto the print substrate 03 by ejection from at least one nozzle, and preferably generates a print spot on the surface of the print substrate 03.

As an alternative to the use of a piezo element, preferably at least one heating element is assigned to each nozzle of at least one print head 06. The heating element at least partially evaporates the printing fluid 02 in a volume of the print head 06 filled with printing fluid 02 and generates a gas bubble. The additional volume of the gas bubble displaces the printing fluid 02, which, in turn, is ejected through the corresponding nozzle and forms at least one printing fluid droplet. Variable heating enables variable droplet sizes.

Above and below, a printing fluid 02 preferably refers to inks, printing inks and/or varnishes, as well as further materials that are transferred and/or can be transferred by way of a printing press or at least one printing unit 01 of the printing press onto a print substrate 03. The printing fluid 02 preferably establishes a preferably visible and/or perceptible, by sensory impressions, and/or machine-detectable texture, preferably in a finely structured form and/or not just over a large surface area, on the print substrate 03. In particular, a printing fluid 02 that is, for example, present in a volume of the print head 06, in particular of the ink jet print head 06, can leave the print head 06 through at least one nozzle, in particular in the form of droplets. Inks and printing inks are preferably solutions or dispersions of at least one colorant in at least one solvent. For example, water and/or organic solvents can be used as solvents. Inks are relatively low viscosity printing fluids 02, while printing inks are relatively high viscosity printing fluids 02. Inks contain no binding agent or relatively little binding agent, whereas printing inks preferably contain a relatively large amount of binding agent, and more preferably contain further auxiliary substances. Colorants can be pigments and/or dyes, wherein pigments are insoluble in the respective solvent, while dyes are soluble in the respective solvent. In particular inks that contain dyes as the colorant preferably do not contain any binding agents. As an alternative or in addition, the printing fluid 02 is embodied, for example, as printing fluid 02 that cures under UV light. Above and below, when printing fluids 02 and/or inks and/or printing inks are mentioned, this in particular also includes colorless coating materials. Coating materials are water-based, for example, or embodied as UV varnish, i.e., curing under UV light. Above and below, when printing fluids are mentioned, this preferably also includes, in particular, agents, in particular priming agents, also referred to as primers, for pretreating, known as priming or precoating, the print substrate 03. The at least one printing fluid 02 is preferably water-based. The printing fluid 02 is preferably a printing fluid 02 for printing decor or for printing packaging and/or folder-type boxes. For example, a first printing fluid 02-1 is a printing fluid 02 for printing decor, and a second printing fluid 02-2 is a printing fluid 02 for printing packaging and/or folder-type boxes.

An axial direction A or transverse direction A is preferably a direction A that extends parallel to an axis of rotation of at least one guide element 08 for print substrate 03, in particular of a guide element 08 configured as a cylinder 08. The transverse direction A is more preferably a direction that extends parallel to a longest side of the nozzle bar 04. The working width is in particular parallel to the transverse direction A. The transverse direction A is preferably oriented orthogonally to an intended transport direction of the print substrate 03 and/or orthogonally to the intended transport path of the print substrate 03 through the printing press. The transport direction is a direction which is intended for a printing operating state of at least one printing unit 01 of the printing press and in which the print substrate 03, if present, is transported at each point of the transport path. The transport direction is preferably a direction that extends in each case parallel to a shortest side of the at least one nozzle bar 04. The spatial area intended for transporting a print substrate 03, which the print substrate 03, if present, at least temporarily occupies, is the transport path. The transport path is established by at least one transport means, in particular by the at least one guide element 08.

Preferably, the at least one guide element 08 is in each case configured as at least one roller and/or at least one cylinder 08 and/or at least one supporting surface and/or at least one other device for guiding the print substrate 03 at least in a printing operating state of the printing press.

The printing press preferably comprises at least one printing fluid supply system 09. Preferably, the at least one printing fluid supply system 09 supplies the at least one print head 06, preferably all print heads 06 of at least one print head row 07, more preferably all print heads 06 of at least one double row, more preferably all print heads 06 of at least one nozzle bar 04, more preferably all print heads 06 ejecting an identical printing fluid 02, with printing fluid 02.

The printing press preferably comprises at least one control unit. Preferably, the at least one printing fluid supply system 09, in particular at least one valve 13; 47; 49 and/or at least one pump 11, is connected to the at least one control unit and/or is controlled by means of the at least one control unit. For example, the printing press comprises at least one control console including at least one monitor. Preferably, an operator adjusts the parameters of the at least one printing fluid supply system 09, such as the pumping power and/or printing fluid used and/or application quantity, in accordance with the present print job by means of the at least one control console, for example by touching switches and/or touching the monitor. Preferably, the operator selects the change from at least one first printing fluid 02-1 to at least one second printing fluid 02-2 and/or a maintenance of the at least one printing fluid supply system 09 by means of the at least one control console, for example by touching switches and/or touching the monitor.

Preferably, the at least one printing fluid supply system 09 comprises at least one pump 11, preferably at least one diaphragm pump, and/or at least one filter 12 and/or at least one valve 13, preferably having at least one open position and at least one closed position.

The at least one printing fluid supply system 09 preferably comprises at least one line and/or at least one tube. Preferably, the at least one printing fluid supply system 09 comprises at least one inflow 17; 33; 37 and/or at least one return 18; 34; 38 and/or at least one negative pressure line 24 and/or at least one circulation line 39 and/or at least one feed line 46 and/or at least one return line 48 and/or at least one disposal line 44, which are preferably each configured as connections and/or lines and/or tubes in terms of conduction. Above and below, an inflow 17; 33; 37 and/or a return 18; 34; 38 preferably constitute a connection, in terms of conduction, of two units to one another, wherein fluid, in particular printing fluid 02 and/or cleaning agent 14, flows from a first unit to a second unit. Above and below, preferably those connections, preferably in terms of conduction, which, in the flow direction of fluid, in particular printing fluid 02 and/or cleaning agent 14, are arranged upstream from the at least one print head 06 and/or which conduct the fluid, for example also indirectly via further lines or units, to the at least one print head 06, are referred to as an inflow 17; 33; 37. In particular, the connections, preferably in terms of conduction, from the at least one reservoir 26; 27; 31 and/or from the at least one collection container 36 and/or from at least one receiver tank 16 to the at least one print head 06 are preferably referred to as an inflow 17; 33; 37. Above and below, preferably those connections, preferably in terms of flow, which, in the flow direction of fluid, in particular printing fluid 02 and/or cleaning agent 14, are arranged downstream from the at least one print head 06 and/or which conduct the fluid, for example also indirectly via further lines or units, away from the at least one print head 06, are referred to as a return 18; 34; 38. In particular, the connections, preferably in terms of conduction, from the at least one print head 06 to at least one intermediate tank 28; 29 and/or to at least one disposal line 32 and/or to the at least one collection container 36 and/or to the at least one receiver tank 16 are referred to as a return 18; 34; 38. The lines of the at least one printing fluid supply system 09, in particular the lines of the inflow 17; 33; 37 and/or of the return 18; 34; 38, for example, have a cross-sectional diameter of 1 mm (one millimeter) to 20 mm (twenty millimeters), more preferably between 3 mm (three millimeters) and 5 mm (five millimeters).

The at least one printing fluid supply system 09 preferably comprises at least one receiver tank 16, which is preferably configured as a printing fluid storage device 16. The at least one receiver tank 16 is preferably configured so as to distribute printing fluid 02 to at least two different print heads 06 of the at least one nozzle bar 04. The at least one receiver tank 16 preferably distributes printing fluid 02 to the at least two different print heads 06 of the at least one nozzle bar 04. For example, the at least one printing fluid supply system 09 comprises the at least one receiver tank 16 configured as a shared receiver tank 16 for an inflow 17 and return 18 of printing fluid 02. For example, the at least one receiver tank 16 has at least two regions that are separated from one another by at least one wall or membrane, in particular at least one inflow container 19 for the inflow 17 of the printing fluid 02 and/or at least one return container 21 for the return 18 of the printing fluid 02.

The at least one printing fluid supply system 09 preferably comprises at least one printing fluid preparation unit 41. The at least one printing fluid preparation unit 41 preferably comprises at least one collection container 36, which is preferably configured as an intermediate storage device, and/or at least one pump 11 and/or at least one valve 13 and/or at least one temperature control unit and/or at least one degassing unit. The viscosity and/or the gas content and/or the temperature of the printing fluid 02 to be printed are preferably adjusted in the at least one printing fluid preparation unit 41. Preferably, the printing fluid 02 is temporarily stored in the at least one collection container 36, for example the turbulence of its flow behavior is reduced thereby. For example, the printing fluid 02 is stirred and/or circulated in the at least one collection container 36, whereby preferably the constituents of the printing fluid 02 are prevented from segregating. Preferably, the temperature of the printing fluid 02 is adjusted in the at least one temperature control unit to at least 20° C., preferably at least 25° C., for example to at least 28° C., and/or to no more than 40° C., preferably to no more than 35° C., for example to no more than 32° C., by way of cooling and/or heating by means of at least one cooling element and/or heating element of the temperature control unit. The printing fluid 02 is preferably degassed by the at least one degassing unit, and preferably oxygen is removed from the at least one printing fluid 02, for example by means of an applied negative pressure. Preferably, a foam formation of the printing fluid 02 within the printing fluid supply system 09 is prevented and/or reduced by means of the at least one degassing unit. Advantageously, the pumping power by means of the at least one pump 11, by means of which the printing fluid 02 is circulated and/or conducted through the printing fluid supply system 09, is adjusted in the at least one printing fluid preparation unit 41. The pumping power is, for example, dependent on the number of the respective connected and/or used print heads 06.

Preferably, at least one component of the at least one printing fluid supply system 09 is arranged inside the at least one printing unit 01, preferably inside its housing. Preferably, the at least one printing unit 01 comprises the at least one printing fluid preparation unit 41 and/or the at least one receiver tank 16 of the printing fluid supply system 09. This advantageously enables a printing fluid preparation, in particular temperature control and/or degassing and/or stirring and/or circulation, just before the at least one printing fluid 02 is used for printing, so that optimal printing of the at least one printing fluid 02 is ensured. More preferably, the at least one nozzle bar 04 comprises the at least one receiver tank 16 and/or the at least one receiver tank 16 is preferably arranged in and/or at the at least one nozzle bar 04, preferably inside its housing. When the distance between the at least one print head 06 and the transport path of print substrate 03 changes, the at least one receiver tank 16 is preferably moved together with the at least one print head 06, preferably by means of the at least one guide of the at least one nozzle bar 04. This advantageously ensures an optimal distribution of the printing fluid 02 to the print heads 06 connected to the receiver tank 16 and/or a temporary storage of the printing fluid 02 just before its use in the print heads 06. The at least one receiver tank 16 is preferably arranged between the at least one printing fluid preparation unit 41 and the at least one print head 06, in the flow direction of printing fluid 02.

Preferably, at least one pressure sensor 22 and/or at least one valve 13, preferably configured as a pressure valve 20, in particular a valve that can be controlled in an open and/or closed loop up to a maximum of 10 bar, and/or, for example, at least one pump 11, in particular, for example, at least one diaphragm pump, are arranged between the at least one receiver tank 16 and the at least one print head 06, in particular between the at least one inflow container 19 and the at least one print head 06 and/or between the at least one print head 06 and the at least one return container 21. Preferably, at least one device for detecting and/or holding back 23 air and/or foam and/or, generally speaking, a gas, for example oxygen, is arranged in the return 18 of the printing press 01, between the at least one print head 06 and the at least one return container 21. Via at least one vacuum line 24, the at least one device for detecting and/or holding back 23 is arranged so as to be functionally connected to a negative pressure source 25. In particular, the at least one negative pressure source 25 is likewise arranged so as to be functionally connected to the at least one return container 21. The at least one negative pressure source 25 is also the driving force for the return flow. A negative pressure in the at least one negative pressure source 25 is generated, for example, by way of a pump and/or a compressor. In a preferred embodiment, the inflow 17 and the return 18 are operated with a negative pressure. In particular, a negative pressure in the inflow 17 is advantageous for maintaining the printing fluid meniscus in the print head 06. In particular, the inflow 17 preferably has a lower pressure than the ambient pressure. For example, the negative pressure is between 20 mbar (twenty millibar) and 100 mbar (one hundred millibar), more preferably between 40 and 80 mbar. More preferably, the pressure in the return 18 is lower than the pressure in the flow, and above all it is lower than the pressure in the inflow 17. In particular, the pressure in the return 18 is provided via the at least one negative pressure source 25 and, for example, via a valve including a controller.

Preferably, at least one inflow 37 leads from the at least one printing fluid preparation unit 41 to the at least one receiver tank 16 and/or at least one return 38 leads from the at least one receiver tank 16 to the at least one printing fluid preparation unit 41. Preferably, at least one circulation system is present between the at least one receiver tank 16 and the at least one printing fluid preparation unit 41, wherein preferably printing fluid 02 and/or cleaning agent 14 circulate in the circulation system between the at least one receiver tank 16 and the at least one printing fluid preparation unit 41. Preferably, at least one closed circulation system exists at least temporarily between the at least one receiver tank 16 and the at least one printing fluid preparation unit 41. Preferably, the at least one closed circulation system is present between the at least one receiver tank 16 and the at least one printing fluid preparation unit 41, for example by closing at least one valve 13, for example the pressure valve 20, from the at least one receiver tank 16 to the at least one print head 06 and/or by closing at least one valve 13 between the at least one printing fluid preparation unit 41 and at least one supply unit 43. Preferably, the at least one valve 13 of the at least one inflow 17 between the at least one receiver tank 16 and the at least one print head 06 and/or the at least one valve 13 of the at least one return 18 between the at least one receiver tank 16 and the at least one print head 06 and/or the at least one valve 13 of the at least one flow 33 between the at least one supply unit 43 and the at least one printing fluid preparation unit 41 and/or the at least one valve 13 of the at least one return 34 between the at least one supply unit 43 and the at least one printing fluid preparation unit 41 are arranged in the closed position while the circulation system is closed. Preferably, printing fluid 02 and/or cleaning agent 14 circulate in a closed circulation system without having to be consumed and/or discharged. For example, printing fluid 02 and/or cleaning agent flows by means of the at least one circulation line 39 from the at least one inflow container 19 to the at least one return container 21, preferably without being conducted through the at least one print head 06. An open circulation system is preferably present between the at least one receiver tank 16 and the at least one printing fluid preparation unit 41 when at least one valve 13, preferably the at least one pressure valve 20, to the at least one print head 06 and/or at least one valve 13, preferably the at least one valve 13 of the inflow 33, to the at least one supply unit 43 is in its open position. Preferably, even though printing fluid 02 and/or cleaning agent 14 circulate between the at least one receiver tank 16 and the at least one printing fluid preparation unit 41 in the open circulation system, the printing fluid 02 and/or cleaning agent 14 are additionally conducted to the at least one print head 06 and/or to the at least one supply unit 43.

Preferably, the at least one printing fluid supply system 09 comprises the at least one supply unit 43 for supplying the at least one print head 06 with printing fluid 02. Preferably, the at least one supply unit 43 supplies the print heads 06 of at least one nozzle bar 04 with printing fluid 02. The at least one supply unit 43 is preferably configured as a device for changing printing fluid 02.

Preferably, at least one component of the at least one printing fluid supply system 09 is arranged outside the at least one printing unit 01, preferably outside its housing, preferably spaced apart from the at least one printing unit 01. The at least one supply unit 43 is preferably arranged outside the at least one nozzle bar 04 and/or outside the at least one printing unit 01. Due to its components, the supply unit 43 requires a lot of space, for example. An arrangement outside the at least one nozzle bar 04 and/or preferably outside the at least one printing unit 01 preferably ensures adequate accessibility of both the components of the supply unit 43 and the components of the printing unit 01 and/or of the nozzle bar 04 by an operator.

Preferably, the at least one supply unit 43 is connected by means of at least one inflow 33 to the component of the at least one printing fluid supply system 09 which is arranged in and/or at the at least one printing unit 01, preferably to the at least one printing fluid preparation unit 41 and/or the at least one receiver tank 16 and/or the at least one print head 06. The at least one inflow 33 preferably comprises at least one valve 13, for example at least two valves 13, and/or at least one pump 11 between the supply unit 43 and the printing fluid preparation unit 41. The at least one valve 13 preferably has at least one closed position and at least one open position. Preferably, the at least one valve 13 allows printing fluid 02 and/or cleaning agent 14 to flow, or prevents printing fluid 02 and/or cleaning agent 14 from flowing, from the at least one supply unit 43 to the component of the at least one printing fluid supply system 09 which is arranged in and/or at the at least one printing unit 01. The at least one valve 13 of the at least one inflow 33 can preferably be controlled.

Preferably, the component of the at least one printing fluid supply system 09 which is preferably arranged in and/or at the at least one printing unit 01, preferably the at least one printing fluid preparation unit 41 and/or the at least one receiver tank 16 and/or the at least one print head 06, are connected to the at least one supply unit 43 by means of at least one return 34. This at least one return 34 preferably comprises at least one valve, for example at least two valves 13. Preferably, the at least one valve 13 of the at least one return 34 allows printing fluid 02 and/or cleaning agent 14 to flow, or prevents printing fluid 02 and/or cleaning agent 14 from flowing, from the component of the at least printing fluid supply system 09 which is preferably arranged in and/or at the at least one printing unit 01 to the at least one supply unit 43. The at least one valve 13 of the at least one return 34 can preferably be controlled. The at least one receiver tank 16 and/or the at least one printing fluid preparation unit 41 are preferably arranged between the at least one supply unit 43 and the at least one print head 06, in the flow direction of printing fluid 02. Preferably, at least one return container 42 is arranged in the flow direction of printing fluid 02 from the at least one receiver tank 16 to the at least one printing fluid preparation unit 41, which preferably collects and/or defoams the at least one printing fluid 02 and/or reduces the turbulence of the current of the at least one printing fluid 02.

The at least one printing fluid supply system 09, preferably the at least one supply unit 43 of the printing fluid supply system 09, comprises at least one, preferably at least two, more preferably at least three reservoirs 26; 27; 31. A reservoir 26; 27; 31 is preferably a source of fluid, in particular cleaning agent 14 or printing fluid 02. The at least one reservoir 26; 27; 31 is preferably at least one container and/or tank, which preferably has a supply of the corresponding fluid, for example at least one JBC container. The at least one supply unit 43 of the at least one printing fluid supply system 09 preferably comprises at least one reservoir 26 of a first printing fluid 02-1. The at least one supply unit 43 of the at least one printing fluid supply system 09 preferably comprises at least one reservoir 27 of a second printing fluid 02-2. For example, the at least one supply unit 43 of the at least one printing fluid supply system 09 comprises at least one reservoir and/or at least one intermediate tank and/or at least one feed line of at least one third printing fluid 02. Preferably, the at least one supply unit 43 of the at least one printing fluid supply system 09 comprises at least one reservoir 31 of at least one cleaning agent 14, for example also at least two reservoirs for at least two, for example different, cleaning agents. The at least one reservoir 26 of the at least one first printing fluid 02-1 and/or the at least one reservoir 27 of the at least one second printing fluid 02-2, preferably and/or the at least one reservoir 31 of the at least one cleaning agent 14 and/or preferably the at least one reservoir of the at least one third printing fluid 02 are preferably connected, in terms of conduction, to the at least one print head 06. In particular, fluid, in particular cleaning agent or printing fluid 02, preferably the at least one first printing fluid 02-1 or the at least one second printing fluid 02-2 or the at least one cleaning agent 14, is conducted from the at least one reservoir 26; 27; 31 to the at least one print head 06, preferably to the print heads 06 of the at least one nozzle bar 04, more preferably to the print heads 06 of the at least one printing unit 01.

The at least one first printing fluid 02-1 and the at least one second printing fluid 02-2 preferably differ from one another by at least one constituent, for example by at least one colorant and/or the concentration of at least one colorant, and/or by their viscosity. The first and second printing fluids 02 preferably have differing colors, for example cyan, magenta, yellow, black, or special colors or color shades of a color that differ from one another, such as light blue and dark blue. Preferably, in addition or as an alternative, the at least one first printing fluid 02-1 is a printing fluid 02 for printing decor, and the at least one second printing fluid 02-2 is a printing fluid 02 for printing packaging and/or folder-type boxes. For example, as an alternative, the at least one first printing fluid 02-1 is a printing fluid 02 for printing packaging and/or folder-type boxes, and the at least one second printing fluid 02-2 is a printing fluid 02 for printing decor. Preferably, the at least one printing fluid 02, preferably the at least one first printing fluid 02-1, and/or the at least one second printing fluid 02-2, is water-based.

The at least one cleaning agent 14 is preferably configured so as to remove residue of printing fluid 02, for example deposits and/or flocculated constituents of the printing fluid 02 and/or dirt and/or dust. Preferably, the at least one cleaning agent 14 prevents at least one component of the at least one printing fluid supply system 09, preferably at least one inflow 17; 33; 37, and/or at least one return 18; 34; 38 and/or at least one further line, for example the negative pressure line 24 and/or the circulation line 39 and/or the feed line 46 and/or the return line 48 and/or the disposal line 44, and/or of the at least one receiver tank 16 and/or of the at least one printing fluid preparation unit 41 and/or of the at least one print head 06 from algae and/or mold and/or bacteria and/or fungi growth. The at least one printing fluid supply system 09 is preferably cleaned by means of the at least one cleaning agent 14. Preferably, the at least one cleaning agent 14 comprises at least one solvent, preferably water and/or alcohol, and/or at least one biocide, preferably at least one isothiazole, for example benzisothiazolinone, and/or at least one surfactant, preferably lauryl sulfate and/or at least one ether, and/or at least one defoamer, preferably at least one polyether or at least one siloxane or at least one polyether-siloxane copolymer, and/or at least one acid, preferably citric acid, and/or at least one lye, preferably sodium hydroxide. The at least one cleaning agent 14 is preferably compatible with the at least one printing fluid 02. In particular, the at least one printing fluid 02 is mixed with the at least one cleaning agent without constituents of the at least one printing fluid 02 and/or of the cleaning agent 14 precipitating and/or flocculating.

Preferably, the printing fluid supply system 09, preferably the at least one supply unit 43, comprises at least one disposal station 32. Preferably, the at least one disposal station 32 comprises at least one waste container. Contaminated printing fluid 02 and/or cleaning agent 14 used for cleaning are preferably conducted into the at least one disposal station 32 and/or collected there, in particular for a subsequent disposal. At least the cleaning agent 14 is preferably disposed of after a cleaning step in the at least one disposal station 32.

The at least one supply unit 43 preferably comprises at least one intermediate tank 28; 29. The at least one supply unit 43 preferably comprises at least one intermediate tank 28 of the at least one first printing fluid 02-1. In addition or as an alternative, the at least one supply unit 43 preferably comprises at least one intermediate tank 29 of the at least one second printing fluid 02-2. The at least one supply unit 43 preferably comprises at least one intermediate tank 28 of the at least one first printing fluid 02-1 and/or at least one intermediate tank 29 of the at least one second printing fluid 02-2. For example, the at least one intermediate tank 28; 29 in each case has a capacity of at least 10 L (ten liters), preferably of at least 20 L, more preferably of at least 30 L, and/or of no more than 100 L (one hundred liters), preferably of no more than 70 L, more preferably of no more than 50 L. The at least one intermediate tank 28; 29 is preferably in each case a storage device and/or buffer of the at least one printing fluid 02, i.e., of the first or the second printing fluid 02-2. The at least one intermediate tank 28; 29 is preferably arranged between the at least one reservoir 26; 27 of printing fluid 02 and the at least one print head 06, in each case in the flow direction of printing fluid 02. This means preferably that the at least one intermediate tank 28 of the at least one first printing fluid 02-1 is arranged between the at least one reservoir 26 of the at least one first printing fluid 02-1 and the at least one print head 06, in the flow direction of printing fluid 02, and/or that the at least one intermediate tank 29 of the at least one second printing fluid 02-2 is arranged between the at least one reservoir 27 of the at least one second printing fluid 02-2 and the at least one print head 06, in the flow direction of printing fluid 02. The at least one intermediate tank 28 of the at least one first printing fluid 02-1 and/or the at least one intermediate tank 29 of the at least one second printing fluid 02-2 are preferably connected, in terms of conduction, to the at least one print head 06. Preferably, the at least one printing fluid 02, i.e., preferably the first or second printing fluid 02-2, is in each case pumped and/or conducted from its at least one intermediate tank 28; 29 into the at least one printing unit 01, preferably to the at least one print head 06, and preferably additionally to the at least one printing fluid preparation unit 41 and/or the at least one receiver tank 16. More preferably, the at least one first printing fluid 02-1 is pumped and/or conducted from its at least one reservoir 26 into the at least one printing unit 01, preferably to the at least one print head 06, and preferably additionally to the at least one printing fluid preparation unit 41 and/or the at least one receiver tank 16, by means of its at least one intermediate tank 28. As an alternative, the at least one second printing fluid 02-2 is preferably pumped and/or conducted from its at least one reservoir 27 into the at least one printing unit 01, preferably to the at least one print head 06, and preferably additionally to the at least one printing fluid preparation unit 41 and/or the at least one receiver tank 16, by means of its at least one intermediate tank 29.

Preferably, at least one filter 12 and/or at least one pump 11 and/or at least one valve 13 are in each case arranged in the flow direction of printing fluid 02 from the at least one reservoir 26; 27 of printing fluid 02 to the at least one intermediate tank 28; 29, i.e., preferably in each case of the first and/or second printing fluids 02. The at least one printing fluid 02 is preferably purified by means of the at least one filter 12 on the path to the at least one intermediate tank 28; 29. The at least one pump 11 preferably pumps the at least one printing fluid 02 from its reservoir 26; 27. The at least one valve 13 is a check valve, for example. Preferably, the at least one valve 13 opens and/or closes the at least one feed line 46 between the at least one reservoir 26; 27 and the at least one intermediate tank 28; 29. In a preferred embodiment, no return of the printing fluid 02 from the at least one intermediate tank 28; 29 to the respective at least one reservoir 26; 27 is provided.

The at least one supply unit 43 preferably comprises at least one valve 47; 49, preferably configured as a gate and/or at least one check valve.

In the case that the at least one valve 47; 49 is a gate, this gate is preferably configured as at least one valve 13, for example as at least two or three valves 13, for example in each case as at least one valve 13 for each connected reservoir 26; 27; 31 and/or for each connected intermediate tank 28; 29. Preferably, the at least one valve 47; 49 configured as a gate has at least three positions. At least one first position is a closed position, with neither printing fluid 02 nor cleaning agent 14 passing the at least one valve 47; 49 configured as a gate. At least one second and/or at least one third position are an open position, with printing fluid 02 and/or cleaning agent 14 passing the at least one valve 47; 49 configured as a gate.

At least one valve 47 of the at least one supply unit 43 is preferably configured as a feed valve. Preferably, the at least one valve 47 configured as a feed valve is configured so as to feed the at least one printing fluid 02, i.e., the first printing fluid 02-1 and/or second printing fluid 02-2, and/or the at least one cleaning agent 14 to the at least one print head 06, preferably additionally to the at least one printing unit 01, and/or to the at least one printing fluid preparation unit 41 and/or to the at least one receiver tank 16. Advantageously, the at least one valve 47 configured as a feed valve allows the first printing fluid 02-1 or the second printing fluid 02-2 or the cleaning agent 14 to be selected, i.e., to be selectively delivered, so as to conduct it to the at least one printing unit 01, preferably to the at least one print head 06. The at least one reservoir 26 of the at least one first printing fluid 02-1 and/or the at least one reservoir 27 of the at least one second printing fluid 02-2 are preferably connected, in terms of conduction, to the at least one print head 06 by means of the at least one valve 47, preferably at least by means of the at least one feed valve. More preferably, the at least one reservoir 26 of the at least one first printing fluid 02-1 and/or the at least one reservoir 27 of the at least one second printing fluid 02-2 and/or the at least one reservoir 31 of the at least one cleaning agent 14 are connected, in terms of conduction, to the at least one print head 06 by means of the at least one valve 47, preferably a feed valve. Preferably, in each case at least one feed line 46 leads from the at least one reservoir 26; 27; 31 of printing fluid 02 and/or cleaning agent 14 to the at least one valve 47 configured as a feed valve. In this way, in each case dedicated and/or mutually independent transport paths, preferably in each case by means of the at least one feed line 46, are in each case preferably present for the at least one first printing fluid 02-1 and/or the at least one second printing fluid 02-2 and/or the at least one cleaning agent 14 from its at least one reservoir 26; 27; 31 to the at least one valve 47 configured as a feed valve. A contamination of the at least one printing fluid 02, for example of the first printing fluid 02-1, by the at least one cleaning agent 14 and/or by the at least one further printing fluid 02, for example the at least one second printing fluid 02-2, is prevented. When the at least one valve 47 is configured as a check valve, preferably dedicated check valves are present for each printing fluid 02 and/or cleaning agent 14, which preferably form the shared valve 47. The at least one valve 47 can preferably be controlled, in particular by means of the at least one control unit. As an alternative or in addition, for example, the feeding of printing fluid 02 and/or cleaning agent 14 by way of the at least one valve 47 is controlled by means of the at least one pump 11 of the at least one feed line 46, in particular by switching on or switching off the pumping power.

At least one valve 49 of the at least one supply unit 43 is preferably configured as a return valve. Preferably, the at least one valve 49 configured as a return valve is configured so as to conduct the at least one printing fluid 02 and/or the at least one cleaning agent 14 from the at least one print head 06, preferably additionally from the at least one printing unit 01 and/or the at least one printing fluid preparation unit 41 and/or the at least one receiver tank 16, back to the at least one intermediate tank 28 of the at least one first printing fluid 02-1 and/or to the at least one intermediate tank 29 of the at least one second printing fluid 02-2 and/or to the at least one disposal station 32. Preferably, at least one disposal line 44 leads from the at least one valve 49 configured as a return valve to the at least one disposal station 32. The at least one valve 49 configured as a return valve can preferably be controlled, in particular by means of the at least one control unit.

Preferably, the at least one intermediate tank 28; 29, preferably the at least one intermediate tank 28 of the at least one first printing fluid 02-1 and/or the at least one intermediate tank 29 of the at least one second printing fluid 02-2, is arranged, in the flow direction of printing fluid 02, in each case between the at least one reservoir 26; 27, preferably the at least one reservoir 26 of the at least one first printing fluid 02-1 and/or the at least one reservoir 27 of the at least one second printing fluid 02-2, and the at least one valve 47; 49, preferably the at least one valve 47 configured as a feed valve and/or the at least one valve 49 configured as a return valve. In particular, the at least one intermediate tank 28 of the at least one first printing fluid 02-1 is arranged between the at least one reservoir 26 and the at least one valve 47 configured as a feed valve, in the flow direction of printing fluid 02. In addition or as an alternative, the at least one intermediate tank 29 of the at least one second printing fluid 02-2 is preferably arranged between the at least one reservoir 27 and the at least one valve 47 configured as a feed valve, in the flow direction of printing fluid 02. Preferably, at least one feed line 46 leads in each case from the at least one intermediate tank 28; 29 to the at least one valve 47 configured as a feed valve. Preferably, in each case at least one return line 48 leads from the at least one valve 49 configured as a return valve to the at least one intermediate tank 28; 29, preferably in each case to the at least two intermediate tanks 28; 29.

Preferably, the at least one valve 47; 49, preferably the at least one valve 47 configured as a feed valve and/or the at least one valve 49 configured as a return valve, is connected to the at least one control unit of the printing press. The at least one control unit is preferably configured so as to control the at least one valve 47; 49, for example by the operator by means of the at least one control console and/or, for example, automatically by means of the execution of at least one program code. Preferably, the at least one control unit is configured so as to control the at least one, preferably at least two, more preferably all pumps 11 and/or the at least one, preferably at least two, more preferably at least five, more preferably all valves 13 of the printing fluid supply system 09, for example by the operator by means of the at least one control console and/or, for example, automatically by means of the execution of at least one program code.

Depending on the position of the at least one valve 47 configured as a feed valve, for example influenced by the at least one pump 11 in at least one feed line 46 being switched on or switched off and/or by the at least one valve 47 configured as a feed valve being closed or opened, the at least one first printing fluid 02-1 and/or the at least one second printing fluid 02-2 and/or the at least one cleaning agent 14 preferably flow through the at least one valve 47 configured as a feed valve to the at least one print head 06, preferably additionally to the at least one printing unit 01 and/or the at least one printing fluid preparation unit 41 and/or the at least one receiver tank 16.

Selectively, the at least one first printing fluid 02-1 or the at least one second printing fluid 02-2 is preferably conducted from the at least one supply unit 43 of the at least one printing fluid supply system 09 to the at least one print head 06. Preferably by means of the at least one valve 47 configured as a feed valve, the at least one first printing fluid 02-1 or the at least one second printing fluid 02-2 is preferably selectively conducted from the at least one supply unit 43, preferably from the respective intermediate tank 28; 29 of printing fluid 02, to the at least one print head 06, preferably additionally to the at least one printing unit 01 and/or the at least one nozzle bar 04 and/or the at least one receiver tank 16 and/or the at least one printing fluid preparation unit 41. More preferably, the at least one first printing fluid 02-1 or the at least one second printing fluid 02-2 or the at least one cleaning agent 14 is selectively conducted from the at least one supply unit 43, preferably from the respective intermediate tank 28; 29 of printing fluid 02 or from the at least one reservoir 31 of the cleaning agent 14, to the at least one print head 06. The at least one first printing fluid 02-1 is preferably conducted from the at least one reservoir 26 of the first printing fluid 02-1, preferably via the at least one intermediate tank 28, to the at least one print head 06. The at least one second printing fluid 02-2 is preferably conducted from the at least one reservoir 27 of the second printing fluid 02-2, preferably via the at least one intermediate tank 29, to the at least one print head 06. The at least one cleaning agent 14 is preferably conducted from the at least one reservoir 31 of the at least one cleaning agent 14 to the at least one print head 06.

Above and below, the term "selectively" preferably describes that at least two, for example at least three, operating states to be distinguished from one another are present. The at least two operating states can be assumed as a function of operating specifications or further conditions, preferably independently of one another. If, for example, a first element and/or a second element are selectively delivered, this preferably describes that either the first element or the second element or both elements are delivered as a function of operating specifications or other conditions. The printing press preferably comprises the first element and the second element for this purpose.

The at least one first printing fluid 02-1 is preferably conducted from the at least one reservoir 26 of the first printing fluid 02-1 to the at least one valve 47 configured as a feed valve and/or the at least one second printing fluid 02-2 is preferably conducted from the at least one reservoir 27 of the second printing fluid 02-2 to the at least one valve 47 configured as a feed valve and/or the at least one cleaning agent 14 is preferably conducted from the at least one reservoir 31 of the cleaning agent 14 to the at least one valve 47 configured as a feed valve. The at least one first printing fluid 02-1 is preferably conducted from its at least one reservoir 26 by means of its at least one intermediate tank 28 to the at least one valve 47 configured as a feed valve, and/or the at least one second printing fluid 02-2 is preferably conducted from its at least one reservoir 27 by means of its at least one intermediate tank 29 to the at least one valve 47 configured as a feed valve. This advantageously prevents the printing fluids 02 and/or the cleaning agent 14 from mixing with one another. Advantageously, a contamination of the at least one reservoir 26; 27 is prevented by means of the at least one intermediate tank 28; 29.

Preferably, the at least one first printing fluid 02-1 or the at least one second printing fluid 02-2, preferably the at least one first printing fluid 02-1 or the at least one second printing fluid 02-2 or the at least one cleaning agent 14, is conducted from the at least one supply unit 04, arranged outside the at least one nozzle bar 43 and/or outside the at least one printing unit 01, to the at least one print head 06, preferably additionally to the at least one printing unit 01 and/or the at least one nozzle bar 04 and/or the at least one receiver tank 16 and/or the at least one printing fluid preparation unit 41. This advantageously ensures the accessibility of the components of the at least one supply unit 43 and/or of the at least one printing unit 01.

The at least one printing fluid 02, which was previously conducted to the at least one print head 06, is preferably conducted back into its at least one intermediate tank 28; 29, preferably so as to change the at least one printing fluid 02 and/or so as to clean or maintain the at least one printing fluid supply system 09. The at least one first printing fluid 02-1 is conducted back into its at least one intermediate tank 28, preferably prior to the introduction of the at least one cleaning agent 14 and/or prior to the introduction of the at least one second printing fluid 02-2, preferably by means of the at least one valve 49 configured as a return valve, preferably by opening the at least one valve 49 configured as a return valve to the at least one intermediate tank 28 of the at least one first printing fluid 02-1. In addition or as an alternative, the at least one second printing fluid 02-2 is preferably conducted back into its at least one intermediate tank 29, preferably prior to the introduction of the at least one cleaning agent 14 and/or prior to the introduction of the at least one first printing fluid 02-1, preferably by means of the at least one valve 49 configured as a return valve, preferably by opening the at least one valve 49 configured as a return valve to the at least one intermediate tank 29 of the at least one second printing fluid 02-2. Preferably, at least the printing fluid 02 which is present within the circulation system between the at least one receiver tank 16 and the at least one printing fluid preparation unit 41 is conducted back into its at least one intermediate tank 28; 29. Preferably, further valves 49 to further return lines 48 and/or to the at least one disposal line 44 are closed simultaneously. This preferably allows the at least one first or second printing fluid 02-2 to be stored, for example in each case for later use. Advantageously, the consumption, in particular the consumption resulting from disposal, of the at least one first or second printing fluid 02-2 is reduced. In addition or as an alternative, the at least one first printing fluid 02-1 and/or the at least one second printing fluid 02-2 and/or the at least one cleaning agent 14 are preferably conducted into at least one disposal station 32 by means of the at least one valve 49 configured as a return valve. The disposal in the at least one disposal station 32 preferably takes place when the at least one printing fluid 02 is contaminated, for example by cleaning agent residue and/or dust and/or dirt.

The printing press preferably has at least a first operating state in which the at least one print head 06 is preferably supplied with the at least one first printing fluid 02-1. In at least one first feeding step, the at least one print head 06 of the at least one printing unit 01 is preferably supplied with the at least one first printing fluid 02-1. The at least one first printing fluid 02-1 is preferably ejected by means of the at least one print head 06, in particular applied onto the at least one print substrate 03, during the operation of the printing press, in particular during a printing operation. The at least one first printing fluid 02-1 is preferably conducted from the at least one supply unit 43 to the at least one printing unit 01, preferably to the at least one print head 06. Preferably depending on need, and preferably depending on consumption, the at least one first printing fluid 02-1 is preferably added from the at least one supply unit 43, preferably by pumping by means of the at least one pump 11, and/or is conducted from the at least one supply unit 43 to the at least one printing unit 01, in particular to the at least one print head 06. The at least one valve 13 of the at least one inflow 33 is preferably opened for this purpose. The at least one valve 47 configured as a feed valve preferably has at least one open position, wherein the at least one valve 47 to the at least one intermediate tank 28 of the at least one first printing fluid 02-1 is open and/or allows the at least one first printing fluid 02-1 to flow through. The at least one valve 47 is preferably closed simultaneously with the at least one intermediate tank 29 of the at least one second printing fluid 02-2 and/or with the at least one reservoir 27 of the at least one second printing fluid 02-2 and/or with the at least one reservoir 31 of the at least one cleaning agent 14, for example pumps 11, which deliver the at least one second printing fluid 02-2 or the at least one cleaning agent 14, are switched off and/or the relevant valve 47 is in a closed position. If no need exists for adding the at least one first printing fluid 02-1, the at least one valve 13 of the at least one inflow 33 to the at least one supply unit 43 is preferably closed. The at least one first printing fluid 02-1 then preferably circulates between the at least one printing fluid preparation unit 41 and/or the at least one receiver tank 16 and/or the at least one print head 06.

For example, the at least one printing fluid supply system 09 is cleaned and/or maintained, for example at least once a month and/or at least once within 6 weeks, preferably at least once within 3 weeks, more preferably at least once a week and/or at least once a day.

The at least one first printing fluid 02-1 is preferably replaced with the at least one second printing fluid 02-2, for example during a job change. The at least one print head 06 is thus supposed to eject the at least one second printing fluid 02-2, instead of the previous at least one first printing fluid 02-1, with its at least one nozzle. The change of printing fluid 02 is preferably activated by means of at least one mask at the at least one control console, preferably a dedicated mask, by the operator. By actuating a switch and/or an operator panel, the operator preferably selects the relevant printing unit 01 and/or the printing fluid 02 to be changed and/or starts the change process, which preferably includes at least one cleaning step and/or at least one post-rinsing step.

After the at least one first feeding step, the feeding of the at least one first printing fluid 02-1 is preferably stopped. Preferably, the at least one valve 47, preferably the at least one feed valve, changes its position. Preferably, the open position of the at least one valve 47, preferably of the at least one feed valve, to the at least one intermediate tank 28 of the at least one first printing fluid 02-1 and/or to the at least one reservoir 26 of the at least one first printing fluid 02-1 is closed, for example by changing the position and/or by switching off the at least one pump 11, so that preferably the at least one first printing fluid 02-1 cannot pass the at least one valve 47 configured as a feed valve. In addition or as an alternative, the at least one valve 47, preferably the at least one feed valve, preferably opens its previously closed position to the at least one reservoir 31 of the at least one cleaning agent 14, for example by changing the position and/or by switching on the at least one pump 11, so that the at least one cleaning agent 14 can preferably pass the at least one valve 47. In addition or as an alternative, the at least one cleaning agent is preferably introduced into the at least one printing fluid supply system 09, preferably from its at least one reservoir 31. As an alternative, for example, the at least one second printing fluid 02-2 is introduced into the at least one printing fluid supply system 09 directly after the at least one first printing fluid 02-1.

Preferably, the at least one first printing fluid 02-1 is emptied from the circulation system, preferably the open circulation system, between the at least one receiver tank 16 and the at least one printing fluid preparation unit 41, preferably after the at least one feeding step, preferably by discharging it to the at least one supply unit 43. Preferably, the at least one first printing fluid 02-1 is preferably conducted into its at least one intermediate tank 28, preferably after the at least one feeding step, preferably by opening the at least one valve 49 configured as a return valve. The at least one first printing fluid 02-1 is preferably stored in the at least one intermediate tank 28, for example for renewed use later on. Preferably, the at least one printing fluid 02 is not conducted back into its at least one reservoir 26, preferably so as not to contaminate it.

The at least one valve 13 of the at least one return 34 to the at least one supply unit 43 is preferably closed after the at least one first printing fluid 02-1 has been discharged. In addition, for example, the at least one valve 49 configured as a return valve is closed.

The printing press preferably has at least one third operating state in which the at least one print head 06 is preferably supplied with the at least one cleaning agent 14. In at least one cleaning step, the at least one printing fluid supply system 09 is preferably cleaned. After the at least one first feeding step, the at least one printing fluid supply system 09 is preferably rinsed with the at least one cleaning agent 14 in the at least one cleaning step. The at least one cleaning step preferably follows the discharge of the at least one first printing fluid 02-1. Preferably, the at least one cleaning agent 14 is delivered from the at least one supply unit 43, preferably by pumping by means of the at least one pump 11, and/or is conducted from the at least one supply unit 43 to the at least one printing unit 01, preferably to the at least one print head 06 and/or the at least one printing fluid preparation unit 41 and/or the at least one receiver tank 16. The at least one valve 13 of the at least one inflow 33 is preferably opened for this purpose. The at least one valve 47 configured as a feed valve preferably has at least one open position, wherein the at least one valve 47 configured as a feed valve to the at least one reservoir 31 of the at least one cleaning agent 14 is open, for example by the position of the valve 47 and/or by switching on at least pump 11 delivering the at least one cleaning agent 14. Preferably, the at least one valve 47 configured as a feed valve is preferably closed simultaneously with the at least one intermediate tank 28 of the at least one first printing fluid 02-1 and/or with the at least one reservoir 26 of the at least one first printing fluid 02-1 and/or with the at least one intermediate tank 29 of the at least one second printing fluid 02-2 and/or with the at least one reservoir 27 of the at least one second printing fluid 02-2.

Preferably, the at least one cleaning agent 14 preferably circulates at least between the at least one printing fluid preparation unit 41 and the at least one receiver tank 16 of the at least one printing fluid supply system 09 in the at least one cleaning step.

The at least one cleaning agent 14 rinsed in the at least one cleaning step by the at least one printing fluid supply system 09 is preferably conducted into the at least one disposal station 32 and/or disposed of after the at least one cleaning step. The at least one valve 13 of the at least one return 34 to the at least one supply unit 43 is preferably closed in each case after the at least one cleaning agent 14 has been discharged. In addition, for example, the at least one valve 49 configured as a return valve is closed.

At least one first cleaning step is preferably designed as a pre-rinsing step. Preferably, the at least one cleaning agent 14 circulates between the at least one printing fluid preparation unit 41 and the at least one receiver tank 16 of the at least one printing fluid supply system 09 in the at least one first cleaning step designed as a pre-rinsing step. Preferably, the at least one valve 13, for example the at least one pressure valve 20, of the at least one inflow 17 between the at least one receiver tank 16 and the at least one print head 06 and/or the at least one valve 13, for example the at least one pressure valve 20, of the at least one return 18 between the at least one receiver tank 16 and the at least one print head 06 and/or the at least one valve 13 of the at least one flow 33 between the at least one supply unit 43 and the at least one printing fluid preparation unit 41 and/or the at least one valve 13 of the at least one return 34 between the at least one supply unit 43 and the at least one printing fluid preparation unit 41 are closed. During the circulation of the at least one cleaning agent 14 during the pre-rinsing step, the closed circulation system is preferably present between the at least one receiver tank 16 and the at least one printing fluid preparation unit 41.

The at least one cleaning agent 14 preferably circulates during the at least one pre-rinsing step for at least 1 minute, preferably for at least 10 minutes, more preferably for at least 20 minutes, and/or for no more than 60 minutes, preferably for no more than 45 minutes, more preferably for no more than 30 minutes, in the closed circulation system, preferably between the at least one receiver tank 16 and the at least one printing fluid preparation unit 41.

Preferably thereafter, the at least one cleaning agent 14 of the pre-rinsing step is discharged from the at least one printing fluid supply system 09. The at least one cleaning agent 14 is preferably conducted into the at least one disposal station 32. Preferably, the at least one valve 13 of the at least one return 34 changes into the open position between the at least one printing fluid preparation unit 41 and the at least one supply unit 43. The at least one valve 49 configured as a return valve is preferably in the open position to the at least one disposal station 32. The at least one valve 49 configured as a return valve to the at least one intermediate tank 28; 29 and/or to the at least one reservoir 26; 27; 31 is preferably closed. This preferably avoids contamination.

During the pre-rinsing step, a foam formation as a result of the circulation of the at least one cleaning agent 14 is preferably prevented. The at least one cleaning agent 14 preferably dissolves residue of the at least one first printing fluid 02-1 during the pre-rinsing step.

At least one, preferably second, cleaning step is preferably designed as a main rinsing step. The at least one main rinsing step preferably follows the at least one pre-rinsing step.

In the at least one second cleaning step designed as the main rinsing step, the at least one cleaning agent 14 is preferably introduced into the printing fluid supply system 09. Preferably, at least one valve 13 of the at least one return 34 is arranged for this purpose in the closed position between the at least one supply unit 43 and the at least one printing fluid preparation unit 41. In addition or as an alternative, the at least one valve 13 of the at least one flow 33 is preferably arranged in the open position between the at least one supply unit 43 and the at least one printing fluid preparation unit 41. The at least one valve 47 configured as a feed valve to the at least one reservoir 31 of the at least one cleaning agent is preferably open, and preferably additionally is closed to the intermediate tanks 28; 29 and/or reservoirs 26; 27 of printing fluid 02.

Preferably, the at least one cleaning agent 14 circulates between the at least one printing fluid preparation unit 41 and the at least one receiver tank 16 and the at least one print head 06 of the at least one printing fluid supply system 09 in the at least one main rinsing step. The at least one valve 13 of the at least one inflow 33 is preferably closed for this purpose between the at least one supply unit 43 and the at least one printing fluid preparation unit 41 after the at least one cleaning agent 14 has been introduced. Preferably, the at least one cleaning agent 14 circulates during the at least one main rinsing step for at least 20 minutes, preferably at least 30 minutes, more preferably at least 40 minutes, and/or for no more than 300 minutes, preferably for no more than 250 minutes, more preferably for no more than 200 minutes, more preferably for no more than 120 minutes, more preferably for no more than 60 minutes in the circulation system between the at least one receiver tank 16 and the at least one printing fluid preparation unit 41, more preferably in the closed circulation system. As an alternative or in addition, in particular in the case of maintenance and/or so as to improve the operating hygiene, cleaning cycles having a rinsing duration of the main rinsing step of up to 12 hours or longer are preferably provided, for example having a rinsing duration of at least 10 hours, preferably at least 12 hours, more preferably at least 15 hours, and/or, for example, having a rinsing duration of no more than 30 hours, preferably no more than 24 hours, more preferably no more than 20 hours.

Preferably, in the at least one cleaning step designed as a main rinsing step, the cleaning agent 14 is at least temporarily conducted into the at least one print head 06, preferably by at least one adjustment step of the at least one valve 13, preferably of the at least one pressure valve 20, between the at least one receiver tank 16 and the at least one print head 06. Preferably, the at least one cleaning agent 14 is conducted to the at least one print head 06 during the at least one main rinsing step, preferably during at least 50% (fifty percent) of the duration of the circulation in the circulation system and/or after conclusion of the circulation in the closed circulation system. Preferably, the at least one valve 13, preferably in each case the at least one pressure valve 20, of the at least one inflow 17 and/or of the at least one return 18 is arranged in the open position. The at least one first printing fluid 02-1 that has preferably remained in the at least one print head 06 is preferably rinsed out of the at least one print head 06 by means of the at least one cleaning agent 14. In this way, air inclusions and/or foam formation are preferably avoided. In addition or as an alternative, atmospheric pressure is adjusted, for example, at the at least one inflow 17 by means of the at least one negative pressure source 25. The printing fluid meniscus is thus preferably changed, and preferably the at least one first printing fluid 02-1 leaves the at least one print head 06 through its at least one nozzle, preferably without additional activation of the at least one piezo element and/or heating element. More preferably, the at least one first printing fluid 02-1 drizzles from the at least one nozzle. The at least one cleaning agent 14 preferably takes up the volume of the at least one print head 06 vacated by the at least one first printing fluid 02-1. Preferably, the at least one print head 06 is rinsed with the at least one cleaning agent 14 for at least 1 minute, preferably for at least 5 minutes, more preferably for at least 10 minutes, and/or for no more than 30 minutes, preferably for no more than 20 minutes.

Preferably thereafter, the at least one cleaning agent 14 of the main rinsing step is discharged from the at least one printing fluid supply system 09. The at least one cleaning agent 14 is preferably conducted into the at least one disposal station 32. Preferably, the at least one valve 13 of the at least one return 34 changes into the open position between the at least one printing fluid preparation unit 41 and the at least one supply unit 43. The at least one valve 49 configured as a return valve is preferably in the open position to the at least one disposal station 32. The at least one valve 49 configured as a return valve to the at least one intermediate tank 28; 29 and/or to the at least one reservoir 26; 27; 31 is preferably closed. This preferably avoids contamination.

During the at least one main rinsing step, a foam formation as a result of the circulation of the at least one cleaning agent 14 is preferably prevented. The at least one cleaning agent 14 preferably dissolves residue of the at least one first printing fluid 02-1 during the at least one main rinsing step.

Preferably, the at least one valve 13 of the at least one return 34 to the at least one supply unit 43 is closed after the at least one cleaning agent 14 has been discharged. In addition, for example, the at least one valve 49 configured as a return valve is closed.

The feeding of cleaning agent 14 is preferably stopped after the at least one cleaning step. Preferably, the at least one valve 47, preferably the at least one feed valve, changes its position. The open position of the at least one valve 47, preferably of the at least one feed valve, to the at least one reservoir 31 of the at least cleaning agent 14 is preferably closed, for example by changing the position and/or by switching off the at least one pump 11, so that the at least one cleaning agent 14 preferably cannot pass the at least one valve 47 configured as a feed valve. In addition or as an alternative, the at least one valve 47, preferably the at least one feed valve, preferably opens its previously closed position to the at least one intermediate tank 29 of the at least one second printing fluid 02-2 and/or to the at least one reservoir 31 of the at least one second printing fluid 02-2, for example by changing the position and/or by switching on the at least one pump 11, so that preferably the at least one second printing fluid 02-2 can pass the at least one valve 47 configured as a feed valve. In addition or as an alternative, the at least one second printing fluid 02-2 is preferably introduced into the at least one printing fluid supply system 09, preferably from its at least one intermediate tank 29 and/or from its at least one reservoir 27, for example by pumping by way of the at least one pump 11. Subsequent to the at least one cleaning step using cleaning agent 14, the at least one second printing fluid 02-2 is preferably conducted to the at least one printing unit 01, preferably the at least one nozzle bar 04 and/or the at least one receiver tank 16 and/or the at least one printing fluid preparation unit 41 and/or the at least one print head 06.

The at least one printing fluid supply system 09 is preferably rinsed with the at least one second printing fluid 02-2 in at least one post-rinsing step, which preferably follows the at least one cleaning step, more preferably which follows the at least one main rinsing step. For example, the at least one second printing fluid 02-2 then circulates in the at least one circulation system between the at least one receiver tank 16 and the at least one printing fluid preparation unit 41. Preferably, the at least one valve 13, preferably in each case the at least one pressure valve 20, of the at least one inflow 17 and/or of the at least one return 18 is arranged in the closed position, and/or the at least one valve 13 of the at least one inflow 33 from the at least one supply unit 43 is closed and/or the at least one valve 13 of the at least one return 34 to the at least one supply unit 43 is closed, so that the at least one second printing fluid 02-2 preferably circulates in the closed circulation system. Preferably, the at least one second printing fluid 02-2 circulates in the at least one post-rinsing step between the at least one printing fluid preparation unit 41 and the at least one receiver tank 16 and the at least one print head 06 of the printing fluid supply system 09 for at least 1 minute, preferably for at least 5 minutes, more preferably at least 10 minutes, and/or for no more than 30 minutes, preferably no more than 20 minutes, more preferably no more than 15 minutes.

Preferably, the at least one valve 13, preferably in each case the at least pressure valve 20, of the at least one inflow 17 and/or of the at least one return 18 is subsequently arranged in the open position. The at least one second printing fluid 02-2 preferably flows through the at least one print head 06. Preferably, the at least one print head 06 is rinsed in the at least one post-rinsing step with the at least one second printing fluid 02-2. The at least one second printing fluid 02-2 preferably leaves the at least one print head 06 in the at least one post-rinsing step through at least one nozzle of the at least one print head 06. For example, the at least one second printing fluid drizzles from the at least one print head 06 through the at least one nozzle under atmospheric pressure adjusted by means of the at least one negative pressure source 25.

This multi-stage rinsing process preferably prevents the formation of foam within the at least one printing fluid supply system 09.

Subsequent to the at least one post-rinsing step, the at least one second printing fluid 02-2 is preferably conducted into the at least one disposal station 32. The at least one second printing fluid 02-2 is preferably conducted to the at least one disposal station 32 after the at least one post-rinsing step, preferably by opening the at least one valve 49 configured as a return valve. Preferably, the at least one valve 13 of the at least one return 34 changes into the open position between the at least one printing fluid preparation unit 41 and the at least one supply unit 43. The at least one valve 49 configured as a return valve is preferably in the open position to the at least one disposal station 32. The at least one valve 49 configured as a return valve to the at least one intermediate tank 28; 29 and/or to the at least one reservoir 26; 27; 31 is preferably closed.

This preferably prevents contaminations and/or cleaning agent 14 residue in the at least one second printing fluid 02-2 to be printed, which is applied to the at least one print substrate 03. A formation of foam is preferably prevented.

The printing press preferably has at least one second operating state in which the at least one print head 06 is preferably supplied with the at least one second printing fluid 02-2. Preferably, at least one second feeding step for feeding the at least one second printing fluid 02-2 follows the at least one cleaning step and/or the at least one post-rinsing step. The at least one second printing fluid 02-2 is preferably introduced into the at least one printing fluid supply system 09 after the at least one post-rinsing step. Preferably, the at least one print head 06 of the at least one printing unit 01 is supplied with the at least one second printing fluid 02-2 in the at least one second feeding step, which preferably follows the change of the at least one printing fluid 02, and preferably the at least one print substrate 03 is printed with the at least one second printing fluid 02-2.

Preferably, the at least one valve 13 of the at least one return 34 to the at least one supply unit 43 is closed after the at least one second printing fluid 02-2 of the at least one post-rinsing step has been discharged. In addition, for example, the at least one valve 49 configured as a return valve is closed. Preferably, the at least one valve 13 of the at least one flow 33 from the at least one supply unit 43 is opened after the at least one second printing fluid 02-2 of the at least one post-rinsing step has been discharged.

For example, the at least one valve 47 configured as a feed valve remains in the open position, which was set during the at least one post-rinsing step, to the at least one intermediate tank 29 of the at least one second printing fluid 02-2 and/or to the at least one reservoir 31 of the at least one second printing fluid 02-2. For example, during an interim change of its position, the at least one valve 47 configured as a feed valve to the at least one intermediate tank 29 of the at least one second printing fluid 02-2 and/or to the at least one reservoir 31 of the at least one second printing fluid 02-2 is preferably opened after the at least one post-rinsing step, so that the at least one second printing fluid 02-2 can preferably pass the at least one valve 47 configured as a feed valve.

The at least one second printing fluid 02-2 is preferably conducted into the at least one printing fluid supply system 09, preferably from its at least one intermediate tank 29 and/or from its at least one reservoir 27, for example by pumping by way of the at least one pump 11. Subsequent to the at least one post-rinsing step with the at least one second printing fluid 02-2, the at least one second printing fluid 02-2 is preferably conducted to the at least one printing unit 01, preferably the at least one nozzle bar 04 and/or the at least one receiver tank 16 and/or the at least one printing fluid preparation unit 41 and/or the at least one print head 06. The at least one second printing fluid 02-2 is preferably maintained in circulation between the at least one printing fluid preparation unit 41 and the at least one receiver tank 16 in the at least one printing fluid supply system 09 after the at least one post-rinsing step. In particular, as soon as the at least one receiver tank 16 and/or the at least one printing fluid preparation unit 41 have been filled with the at least one second printing fluid 02-2 and/or a predefined storage level has been reached, the at least one valve 13 of the at least one inflow 33 from the at least one supply unit 43 is preferably closed. The negative pressure is preferably adjusted by means of the at least one negative pressure source 25, preferably the negative pressure that is required for printing. Preferably depending on need, and preferably depending on consumption, the at least one second printing fluid 02-2 is preferably added from the at least one supply unit 43, preferably by pumping by means of the at least one pump 11, and/or is conducted from the at least one supply unit 43 to the at least one printing unit 01, in particular to the at least one print head 06, for which purpose the at least one valve 13 of the at least one inflow 33 from the at least one supply unit 43 is preferably opened.

For example, the printing press comprises a dedicated printing fluid supply system 09 for each printing unit 01. As an alternative, for example, the printing press comprises a shared printing fluid supply system 09 for all printing units 01, preferably each including dedicated lines and/or supply units 43 and/or printing fluid preparation units 41 and/or receiver tanks 16 for each printing unit 01. Preferably, at least two different printing fluid supply systems 09 are provided so as to supply at least two print heads 06 with printing fluid 02, which in a printing operating state of the printing press eject different printing fluids 02 and/or are assigned to different nozzle bars 04.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A method for changing printing fluid of at least one printing fluid supply system of a printing press, at least one printing unit of the printing press comprising at least one print head, the method comprising:

selectively supplying one of at least one first printing fluid or at least one second printing fluid from at least one supply unit of the at least one printing fluid supply system to the at least one print head, the at least one supply unit comprising at least one reservoir of the at least one first printing fluid and at least one reservoir of the at least one second printing fluid, the at least one supply unit further comprising at least one intermediate tank of the at least one first printing fluid arranged between the at least one reservoir of the at least one first printing fluid and the at least one print head in a flow direction of the at least one first printing fluid, the at least one supply unit further comprising at least one intermediate tank of the at least one second printing fluid arranged between the at least one reservoir of the at least one second printing fluid and the at least one print head in a flow direction of the at least one second printing fluid, wherein the at least one first printing fluid or the at least one second printing fluid is selectively supplied from its a respective at least one intermediate tank to the at least one print head during the selectively supplying, and transferring the one of the at least one first printing fluid or the at least one second printing fluid previously supplied to the at least one print head back into the respective at least one intermediate tank prior to supplying the other one of the at least one first printing fluid or the at least one second printing fluid to the at least one print head, wherein no return of the printing fluid from the respective at least one intermediate tank to a respective at least one reservoir is provided.

2. The method according to claim 1, wherein the method further comprises:

selectively supplying one of the at least one first printing fluid, or the at least one second printing fluid, or at least one cleaning agent from the at least one supply unit to the at least one print head.

3. The method according to claim 1, wherein the method further comprises:

at least one first feeding step in which the at least one print head of the at least one printing unit is supplied with the at least one first printing fluid, after the at least one first feeding step, stopping the feeding of the at least one first printing fluid and introducing at least one cleaning agent into the at least one printing fluid supply system, after the at least one first feeding step, rinsing the at least one printing fluid supply system with the at least one cleaning agent in at least one cleaning step, and that, after the at least one cleaning step, stopping feeding of the cleaning agent and introducing the at least one second printing fluid into the at least one printing fluid supply system.

4. The method according to claim 1, wherein at least one of:

selectively, the at least one first printing fluid or the at least one second printing fluid is supplied from the at least one supply unit to the at least one print head by means of at least one valve configured as a feed valve, or selectively, the at least one first printing fluid, or the at least one second printing fluid, or the at least one cleaning agent is supplied from the at least one supply unit to the at least one print head by means of the at least one valve configured as a feed valve.

5. The method according to claim 1, wherein the at least one supply unit is arranged outside at least one nozzle bar and/or outside the at least one printing unit.

6. The method according to claim 1, wherein the at least one printing unit comprises at least one printing fluid preparation unit and at least one receiver tank of the at least one printing fluid supply system.

7. The method according to claim 1, wherein the at least one printing fluid supply system is rinsed with the at least one second printing fluid in at least one post-cleaning step, and wherein at least one of:

the at least one second printing fluid leaves the at least one print head in the at least one post-cleaning step through at least one nozzle of the at least one print head, or the at least one second printing fluid is transferred to at least one disposal station after the at least one post-cleaning step.

8. The method according to claim 1, wherein:

the at least one first printing fluid is fed into the at least one intermediate tank of the at least one first printing fluid, the at least one first printing fluid is stored in the at least one intermediate tank of the at least one first printing fluid, and the at least one first printing fluid is not returned back into its the at least one reservoir of the at least one first printing fluid.

9. The method according to claim 1, wherein:

the at least one supply unit comprises at least one valve configured as a return valve, and in the flow direction of the at least one first printing fluid and the at least one second printing fluid, the respective at least one intermediate tank is arranged between the respective at least one reservoir and the at least one valve configured as the return valve.

10. The method according to claim 9, wherein the at least one valve configured as the return valve at least one of:

transfers the at least one first printing fluid from the at least one print head back to the at least one intermediate tank of the at least one first printing fluid and/or to at least one disposal station; or transfers the at least one second printing fluid from the at least one print head back to the to the at least one intermediate tank of the at least one second printing fluid and/or to the at least one disposal station.

11. A method for cleaning and/or maintaining at least one printing fluid supply system of a printing press, the method comprising:

in at least one first feeding step, supplying at least one print head of at least one printing unit with at least one first printing fluid, at least one supply unit of the printing fluid supply system comprising at least one intermediate tank of the first printing fluid, after the at least one first feeding step, stopping the supplying of the at least one first printing fluid and transferring the at least one first printing fluid back into the at least one intermediate tank of the at least one first printing fluid, feeding at least one cleaning agent into the at least one printing fluid supply system, after the at least one first printing fluid is transferred back into the at least one intermediate tank, rinsing the at least one printing fluid supply system with the at least one cleaning agent in at least one cleaning step, after the at least one cleaning step, stopping the feeding of the cleaning agent, and introducing at least one second printing fluid into the at least one printing fluid supply system, wherein the at least one printing fluid supply system is rinsed with the at least one second printing fluid in at least one post-cleaning step, and wherein the at least one second printing fluid is transferred to at least one disposal station after the at least one post-cleaning step.

12. The method according to claim 11, wherein:

the at least one supply unit comprises at least one reservoir of the at least one first printing fluid and at least one reservoir of the at least one second printing fluid, the at least one intermediate tank of the at least one first printing fluid is arranged between the at least one reservoir of the at least one first printing fluid and the at least one print head in a flow direction of the at least one first printing fluid, and the at least one intermediate tank of the at least one second printing fluid is arranged between the at least one reservoir of the at least one second printing fluid and the at least one print head in a flow direction of the at least one second printing fluid.

13. The method according to claim 11, wherein:

the at least one printing unit comprises at least one printing fluid preparation unit and at least one receiver tank of the at least one printing fluid supply system, and the at least one cleaning agent circulates between the at least one printing fluid preparation unit and the at least one receiver tank of the at least one printing fluid supply system in the at least one cleaning step.

14. The method according to claim 11, wherein:

the at least one first printing fluid is transferred into the at least one intermediate tank of the at least one first printing fluid, the at least one first printing fluid is stored in the at least one intermediate tank of the at least one first printing fluid, and the at least one first printing fluid is not returned back into the at least one reservoir of the at least one first printing fluid.

15. A printing press comprising at least one printing fluid supply system, the at least one printing fluid supply system comprising at least one supply unit for supplying at least one print head with printing fluid, the at least one supply unit comprising at least one reservoir of at least one first printing fluid, the at least one supply unit comprising at least one reservoir of at least one second printing fluid, the at least one reservoir of the at least one first printing fluid and the at least one reservoir of the at least one second printing fluid being connected, in terms of conduction, to the at least one print head, the at least one supply unit comprising at least one intermediate tank of the at least one first printing fluid, and the at least one supply unit comprising at least one intermediate tank of the at least one second printing fluid, characterized in that no return of the printing fluid from the at least one intermediate tank to the respective at least one reservoir is provided.

16. The printing press according to claim 15, characterized in that the at least one supply unit comprises at least one valve configured as a feed valve, that the at least one intermediate tank of the at least one first printing fluid is arranged between the at least one reservoir of the at least one first printing fluid and the at least one valve configured as a feed valve, in a flow direction of printing fluid, and/or that the at least one intermediate tank of the at least one second printing fluid is arranged between the at least one reservoir of the at least one second printing fluid and the at least one valve configured as a feed valve, in the flow direction of printing fluid.

17. The printing press according to claim 15, characterized in that the at least one supply unit comprises at least one valve configured as a return valve, that the at least one intermediate tank is in each case arranged between the at least one reservoir and the at least one valve configured as a return valve, in a flow direction of printing fluid, and/or that in each case at least one return line leads from the at least one return valve to the at least one intermediate tank, and/or that the at least one return valve is configured to conduct the at least one printing fluid from the at least one print head back to the at least one intermediate tank of the at least one first printing fluid and/or to the at least one intermediate tank of the at least one second printing fluid and/or to at least one disposal station.

18. The printing press according to claim 15, characterized in that the at least one supply unit comprises at least one reservoir of at least one cleaning agent, and that the at least one reservoir of the at least one cleaning agent is connected, in terms of conduction, to the at least one print head by means of the at least one valve configured as a feed valve.

19. The printing press according to claim 15, wherein at least one of:

the at least one printing fluid supply system comprises at least one receiver tank, which is configured as a printing fluid storage device and/or which is configured so as to distribute printing fluid to at least two different print heads of at least one nozzle bar, or the at least one printing fluid supply system comprises at least one printing fluid preparation unit, comprising at least one collection container.

20. The printing press according to claim 19, wherein at least one of:

the at least one receiver tank is arranged between the at least one supply unit and the at least one print head, in a flow direction of printing fluid, and/or that, or the at least one printing fluid preparation unit is arranged between the at least one supply unit and the at least one print head, in the flow direction of printing fluid, or at least one circulation system is present between the at least one receiver tank and the at least one printing fluid preparation unit.

* * * * *